US012331380B2

(12) United States Patent
Das

(10) Patent No.: US 12,331,380 B2
(45) Date of Patent: Jun. 17, 2025

(54) PROCESS FOR RECOVERING TITANIUM DIOXIDE

(71) Applicant: COMMONWEALTH SCIENTIFIC AND INDUSTRIAL RESEARCH ORGANISATION, Acton (AU)

(72) Inventor: Goutam Kumar Das, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 446 days.

(21) Appl. No.: 17/927,232

(22) PCT Filed: May 18, 2021

(86) PCT No.: PCT/AU2021/050460
§ 371 (c)(1),
(2) Date: Nov. 22, 2022

(87) PCT Pub. No.: WO2021/237274
PCT Pub. Date: Dec. 2, 2021

(65) Prior Publication Data
US 2023/0220516 A1    Jul. 13, 2023

(30) Foreign Application Priority Data

May 26, 2020  (AU) ................. 2020901698

(51) Int. Cl.
*C22B 34/12*  (2006.01)
*C22B 3/10*   (2006.01)
(Continued)

(52) U.S. Cl.
CPC ............ *C22B 34/1245* (2013.01); *C22B 3/10* (2013.01); *C22B 3/22* (2013.01); *C22B 3/42* (2013.01);
(Continued)

(58) Field of Classification Search
CPC ......... C22B 34/1245; C22B 3/10; C22B 3/22; C22B 3/42; C22B 3/44; C22B 21/0015;
(Continued)

(56) References Cited

U.S. PATENT DOCUMENTS 3,903,239 A * 9/1975 Berkovich ......... C01G 23/0538
423/493
3,922,164 A   11/1975 Reid et al.
(Continued)

FOREIGN PATENT DOCUMENTS

AU    2012203546    1/2013
CA    2 875 776     7/2013
(Continued)

OTHER PUBLICATIONS

Jun. 10, 2024 Office Action issued in Indian Patent Application No. 202217069362, pp. 1-3.
(Continued)

*Primary Examiner* — Ricardo D Morales
(74) *Attorney, Agent, or Firm* — Nixon & Vanderhye PC

(57) ABSTRACT

A process for recovering titanium dioxide from a titanium-bearing material, the process including the steps of: leaching the titanium-bearing material in a first leaching step at atmospheric pressure and at a temperature of 70 to 97° C. with a first lixiviant to produce a first leach solution comprising undissolved first leach solids that include a titanium content and a first leach liquor, the first lixiviant comprising hydrochloric acid at a concentration of less than 23% w/w; separating the first leach liquor and the undissolved first leach solids; leaching the first leach solids in a second leaching step at atmospheric pressure and at a temperature of 60 to 80° C. with a second lixiviant in the presence of a Fe powder reductant to produce a second leach solution comprising undissolved second each solids and a second leach
(Continued)

liquor that includes a leached titanium content and iron content, the second lixiviant comprising a mixed chloride solution comprising less than 23% w/w hydrochloric acid and an additional chloride selected from alkali metal chlorides, magnesium chloride and calcium chloride, or mixtures thereof; separating the second leach liquor and the undissolved second leach solids; and thereafter separating the titanium dioxide and the iron content from the second leach liquor by precipitation, and regenerating the second lixiviant for recycle to the second leaching step.

20 Claims, 9 Drawing Sheets

(51) Int. Cl.
  *C22B 3/22* (2006.01)
  *C22B 3/42* (2006.01)
  *C22B 3/44* (2006.01)
  *C22B 21/00* (2006.01)
  *C22B 26/22* (2006.01)
  *C22B 34/22* (2006.01)
  *C22B 47/00* (2006.01)
(52) U.S. Cl.
  CPC ............ *C22B 3/44* (2013.01); *C22B 21/0015* (2013.01); *C22B 26/22* (2013.01); *C22B 34/22* (2013.01); *C22B 47/00* (2013.01)
(58) Field of Classification Search
  CPC ......... C22B 26/22; C22B 34/22; C22B 47/00; Y02P 10/20
  See application file for complete search history.

(56) References Cited

U.S. PATENT DOCUMENTS

| | | |
|---|---|---|
| 4,119,696 A | 10/1978 | Tolley |
| 7,803,336 B2 | 9/2010 | Lakshmanan et al. |
| 2013/0195738 A1* | 8/2013 | Harris .................... C22B 34/22 423/63 |
| 2015/0159239 A1 | 6/2015 | Boudreault et al. |
| 2015/0252448 A1 | 9/2015 | Kamaleddine |

FOREIGN PATENT DOCUMENTS

| | | |
|---|---|---|
| CA | 2 878 744 | 1/2014 |
| CA | 2 891 360 | 6/2014 |
| CN | 107531507 | 1/2018 |
| DE | 2 200 954 | 12/1972 |
| DE | 2405271 | 8/1974 |
| GB | 1096714 | 12/1967 |
| WO | 96/24555 | 8/1996 |
| WO | 2005/038060 | 4/2005 |
| WO | 2005/049872 | 6/2005 |
| WO | 2006/105611 | 10/2006 |
| WO | 2008/028244 | 3/2008 |
| WO | 2011/094858 | 8/2011 |
| WO | 2014/125275 | 8/2014 |
| WO | 2015/131266 | 9/2015 |

OTHER PUBLICATIONS

International Search Report for PCT/AU2021/050460, mailed Jul. 12, 2021, 7 pages.
Written Opinion of the ISA for PCT/AU2021/060460, mailed Jul. 12, 2021, 4 pages.
Search Report for AU2020901698, mailed Oct. 8, 2020, 20 pages.
Mahmoud et al., "Reductive leaching of ilmenite ore in hydrochloric acid for preparation of synthetic rutile", 2004, Hydrometallurgy vol. 73, pp. 99-109.
Nguyen et al., "A review on the recovery of titanium dioxide from ilmenite ores by direct leaching technologies", 2018, Mineral Processing and Extractive Metallurgy Review, pages, vol. 40, No. 4, pp. 231-247.
Nov. 15, 2023 Office Action issued in Indian Patent Application No. 202217069362, pp. 1-8.

* cited by examiner

PROCESS FOR RECOVERING TITANIUM DIOXIDE

PRIORITY CROSS-REFERENCE

This application is the U.S. national phase of International Application No. PCT/AU2021/050460 filed May 18, 2021, which designated the U.S. and claims priority to AU Patent Application No. 2020901698 filed May 26, 2020, the entire contents of each of which are hereby incorporated by reference.

TECHNICAL FIELD

The present invention generally relates to a process for the recovery of titanium dioxide from a titanium-bearing material. The invention is particularly applicable for recovering titanium dioxide from a titanium-bearing ore or ore concentrate and it will be convenient to hereinafter disclose the invention in relation to that exemplary application. However, it is to be appreciated that the invention is not limited to that application and could be used to recover titanium dioxide from a variety of sources including other orebody containing titanium minerals, vanadium associated with titanium minerals such as titano-magnetite, vanadium-bearing minerals and titanium-bearing leach residues and slags.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Titanium is the ninth most abundant element making up about 0.6% of the Earth's crust. A variety of titanium-bearing minerals occurs in nature including ilmenite ($FeO \cdot TiO_2$ or $TiFeO_3$), rutile ($TiO_2$) and leucoxene ($Fe_2O_3 \cdot nTiO_2$). Ilmenite, containing 40 to 65% $TiO_2$, is reported to be about 91% of the world's demand for titanium minerals. In 2019, the world's ilmenite production reached about 7 million metric tons. In addition to titanium, titanium-bearing minerals typically contain other value metals the content of which may vary widely in type and amount, depending on the source of the ore. A titanium-bearing ore may contain one or more of vanadium, aluminium, manganese, magnesium, molybdenum, chromium, copper, lead, nickel, zinc, zirconium, niobium and tantalum. These titanium-bearing ores typically also include varying amounts of $Fe_2O_3$ and gangue materials, usually silicates, alumina, lime and magnesia.

Titanium-bearing ore may be leached as such or beneficiated to produce a concentrate, beneficiation being employed if the ore is low in titanium content. Processes for the recovery of titanium dioxide from ilmenite and other titanium-bearing ore are known. The majority of these processes involve digestion of the ore in a mineral acid, such as hydrochloric acid (the chloride process) or sulphuric acid (the sulphate process), to remove at least the titanium values from the ore. In many such processes, the purity of the titanium dioxide obtained may be about 90 to 95%, and hence further purification procedures are required to produce a high quality pigment grade product.

The sulphate process is performed through hydrometallurgical route and uses ilmenite ores or low grade titanium slag (72 to 87% $TiO_2$) as raw materials where product quality remains inferior and the process generates large amounts of wastes. In contrast, the chloride process traditionally treats only high grade synthetic rutile (90-95% $TiO_2$), natural rutile (95% $TiO_2$) or high grade titanium slag (>90% $TiO_2$) through a complex process to produce purer products with relatively less waste generation.

Hydrometallurgical processing of ilmenite ores with hydrochloric acid has been the main focus of recent research. A number of processes have been proposed by using i) direct leaching, ii) leaching in the presence of oxidising agent, iii) leaching in the presence of reducing agent such as iron powder, and iv) leaching after pre-oxidation of the concentrate at high temperature. The lixiviant is typically HCl based, either with a high concentration of HCl (30 to 40% w/w) or with the optional addition of a chloride species such as $MgCl_2$ which has been found to enhance direct leach processes.

One important issue for the HCl leaching route for any ore/mineral/concentrate is the cost of the HCl, and therefore its regeneration from the process liquor to ensure the process is economically viable. To regenerate HCl from the process liquor, either pyro-hydrolysis (for example International Patent Publication No. WO 2014/125275 A1) or high temperature hydrolysis (for example International Patent Publication No. WO 2011/094858) techniques are used. Both of these processes are energy intensive, requiring high temperatures: 400 to 800° C. for pyro-hydrolysis decomposition where metal chloride salts are decomposed to metal oxide; and 170 to 180° C. for high temperature hydrolysis to enable the hydrothermal reaction to precipitate remaining metals as metal oxide, for example iron as hematite. Both processes also require expensive reactor construction materials due to highly corrosive gaseous HCl produced at these temperatures.

Another issue with the HCl leaching route is the value metal recovery method. In a number of processes, value metals including titanium and iron are separated using expensive solvent extraction (SX) technique (for example U.S. Pat. No. 7,803,336). The incorporation of solvent extraction technique for recovery of Fe and Ti in a process is capital intensive choice which can hinder successful commercialisation of the process.

An example of one chloride process is taught in Canadian Patent Publication CA2878744 which includes amongst other processes, a process for recovering titanium dioxide and valuable metals from a titanium-containing material using a two-stage chloride based leaching process. The titanium-containing material can be for example chosen from a titanium-bearing ore or a recycled industrial titanium-containing material such as slag, red mud or fly ashes. A first leaching stage uses a HCl based lixiviant having a HCl concentration 25 to 45% w/w and a temperature of 125 to 225° C. on a titanium-containing material comprising Ti, Si and a first metal to produce a first leach liquor of the first metal and a Si and Ti bearing solid. The leach liquor and solid are separated with tailored recovery processes used to recover the first metal from the first leach liquor. The Si and Ti bearing solid from the first stage undergoes a second leaching using a lixiviant comprising less than 20% w/w HCl and at less than 85° C., in the presence of a chloride (either $MgCl_2$ or $ZnCl_2$) to produce a second leach liquor including $TiCl_4$. Titanium is recovered as $TiO_2$ by heating, solvent extraction and subsequent formation of titanium dioxide from said solvent extraction, or reacted with water, oxygen and/or a base to cause precipitation of $TiO_2$. HCl from the leach liquor is regenerated. Hematite ($Fe_2O_3$)

recovery from $FeCl_3$ that may be in the leach liquor from the ore can also be achieved using high temperature hydrolysis at 160 to 175° C. generating HCl for recycle to the leach stages.

Whilst CA2878744 provides a versatile chloride leach, the conditions of the first leaching stage provide non-ideal, capital intensive conditions for recovery of a number of important valuable metals, in particular the high concentration of the HCl lixiviant and high temperature. Moreover, the second leaching stage is conducted in conditions that require the resulting metal values, including any iron content, in the lixiviant to be recovered in an energy intensive manner.

Another chloride process is taught in international patent publication WO2015/131266 which relates to a process for high grade synthetic rutile (95 to 98% $TiO_2$) recovery from low grade ores containing less than 12% $TiO_2$. Like the previous patent publication, this process comprises a two-stage leaching in 35 to 40% w/w HCl with an acid to ore ratio of 2 to 2.5. The first stage leach is performed with ground ore having particle size of 80% minus 200 mesh at 60 to 70° C. The second stage leaching performed with the first stage leach residue at 75 to 80° C. The leach liquors from both the leaching stages after solid liquid separation, are combined and boiled to distil off the unreacted HCl until dissolved titanium is hydrolysed and a substantial part of the iron chlorides precipitate as hydrate. After filtering the slurry of hydrolysed titanium with iron chloride crystals, the crystals are dissolved in minimum of dilute HCl leaving the insoluble $TiO(OH)_2$ which is calcined to obtain 95 to 98% $TiO_2$ product. The Ti free liquor obtained after Ti hydrolysis step is further treated to recover V and Cr separately either through solvent extraction or selective precipitation. The HCl lixiviant is regenerated using a spray type reactor to undergo high temperature hydrolysis in a slightly oxidising atmosphere to produce iron oxide and HCl for the recovery of iron and hydrochloric acid. However, once again a number of the value metal recovery process including iron recovery and the HCl regeneration stage are energy intensive.

It would therefore be desirable to provide an improved or at least alternative process to recover titanium/titanium dioxide from a titanium-bearing material such as titanium-bearing ores or concentrates.

SUMMARY OF THE INVENTION

A first aspect of the present invention provides a process for recovering titanium dioxide from a titanium-bearing material, the process including the steps of:

leaching the titanium-bearing material in a first leaching step at atmospheric pressure and at a temperature of 70 to 97° C. with a first lixiviant to produce a first leach solution comprising undissolved first leach solids that include a titanium content, preferably substantially all of the titanium content of the titanium-bearing material, and a first leach liquor, the first lixiviant comprising hydrochloric acid at a concentration of less than 23% w/w;

separating the first leach liquor and the undissolved first leach solids;

leaching the first leach solids in a second leaching step at atmospheric pressure and at a temperature of 60 to 80° C. with a second lixiviant in the presence of a Fe powder reductant to produce a second leach solution comprising undissolved second leach solids and a second leach liquor that includes a leached titanium content and iron content, the second lixiviant comprising a mixed chloride solution comprising less than 23% w/w hydrochloric acid and an additional chloride selected from alkali metal chlorides, magnesium chloride and calcium chloride, or mixtures thereof;

separating the second leach liquor and the undissolved second leach solids;

precipitating titanium dioxide from the second leach liquor by addition of heated or boiling water under an inert gas or nitrogen atmosphere to raise the temperature of the second leach liquor to 85 to 100° C. to produce a treated second leach liquor and a titanium dioxide containing solid;

separating the titanium dioxide containing solid from the treated second leach liquor;

precipitating the iron content from the treated second leach liquor by adding a neutralising agent and an oxidant to the treated second leach liquor at a temperature of 70 to 90° C. to raise the pH of the second leach liquor to 4 to 8 to produce an iron removed slurry comprising an iron removed second leach liquor and an iron precipitated solid;

separating the iron removed second leach liquor from the iron precipitated solid; and regenerating the second lixiviant for recycle to the second leaching step, thereby recovering the titanium from the second leach solution as titanium dioxide.

Two-Stream Leaching Process

The process of the present invention relates to a two-stream leaching process using a hydrochloric acid leach followed by a mixed hydrochloric acid and calcium chloride leach which firstly selectively leaches impurities and value metals (such as vanadium and aluminium) other than titanium from the titanium-bearing material in the first leaching step and then selectively leaches the titanium content from the titanium-bearing material in a second leaching step which can then be recovered. This double leach process strategy results a more effective leaching process that specifically targets titanium in the second leach step, compared to prior single step leaching processes where titanium is dissolved from the ore materials along with the impurities either in a single stage leaching.

Importantly, the second leaching step is conducted under reducing atmosphere using metallic Fe powder. Reducing conditions provide the advantage of higher Ti extraction of Ti minerals such as ilmenite, rutile, pseudo-rutile, anatase, and the like from the first leach solids and therefore from the feed titanium-bearing material. In this leaching step, the iron powder addition is aimed to assist the dissolution of titanium-bearing minerals. Removal of this iron content is through the iron precipitation from ferrous chloride solution and an oxidant (for example alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid, an oxygen containing gas such as air or oxygen, other non-sulphur containing oxidants, or mixtures thereof) and a neutralising agent (such as limestone, lime or MgO) thereby precipitating iron, typically in the form of one or more of goethite (α-FeOOH), akaganeite (β-FeOOH), hematite ($Fe_2O_3$), magnetite ($Fe_3O_4$), or mixture thereof, or preferably as magnetite only. The iron removal method of the present invention provides significant advantages over conventional iron removal techniques which typically focus on more expensive (higher running costs) removal techniques such as pyro-hydrolysis of hydrated ferrous chloride or high temperature hydrolysis of ferric chloride to hematite ($Fe_2O_3$).

It should be appreciated that the "titanium-bearing material" can be any material including material containing titanium species comprising one or more of:
 a. a titanium-bearing ore material including titanium-bearing ore or orebody, concentrate thereof, modified, ore thereof and tailings thereof, and mixtures thereof;
 b. orebody containing titanium minerals such as ilmenite, rutile and/or leucoxene;
 c. vanadium associated with titanium minerals such as titano-magnetite, vanadium bearing minerals;
 d. a titanomagnetite ore or orebody, concentrate thereof, modified, ore thereof and tailings thereof, and mixtures thereof;
 e. titanium-bearing leach residues and slags; or
 f. mineral processing residues.

In preferred embodiments, the titanium-bearing material is a titanium-bearing ore, titanium-bearing ore concentrate, modified ore tailings of titanium-bearing ore or a mixture thereof. In some embodiments, the titanium-bearing material is a titaniferous ore, concentrate thereof, modified, ore thereof and tailings thereof, or mixtures thereof. In these embodiments, titanium and iron values are leached from the titanium-bearing ore material. In embodiments, the titanium-bearing material includes ilmenite. However, it should be appreciated that the titanium-bearing material can include other titanium minerals including (but not limited to) rutile, pseudo-rutile, anatase and/or leucoxene.

The titanium-bearing ore material may be ore per se but is preferably a concentrate thereof. Techniques for treating titanium-bearing ore such as ilmenite ore, to form a concentrate or for beneficiation of the ore, are well known in the art and include the use of gravity or magnetic separation steps. The process is preferably operated with a concentrate of the ore. In other embodiments, the ore may have been subjected to a smelting step in the presence of carbon and/or fluxing agents, after which a slag is separated from the smelting process and subjected to the leaching step. Thus, the ore could be in the form of a matte, e.g. converter matte or liquid furnace matte. The ore could also be in the form of roasted and/or reduced titanium-containing concentrates or other intermediates, all of which including the matte discussed above being referred to herein as modified ores. The ore may also be in the form of tailings of a titanium-bearing ore. It is understood that the expression "ore" also includes any other form of the ore, and that mixtures of the various forms of the ore may be used. The process of the present invention may be operated without pre-treatment of the titanium-bearing ore. In particular, the process may be operated with or without roasting or reduction of the ore.

Pre-treatment of the ore for example oxidation and/or reduction of the ore, is typically not required prior to leaching. The process operates with a relatively low concentration of hydrochloric acid, especially with the concentration of hydrochloric acid being less than 23% w/w (weight ratio). The process may be described as a direct process for leaching and recovery of titanium, as pre-treatment of the ore is not required, and the leaching step produces a solution of titanium values. The process of the present invention is considered to be friendly to the environment, not requiring extensive pre-treatment procedures.

First Leach Process Stream

The process of the present invention is a two-stream process to treat the titanium-bearing material, where each process stream can be operated independently on its own having respective dissolved value metals recovery and lixiviant regeneration.

The first leaching step is primarily directed to separating out any hydrochloric acid soluble impurities and value metals such as vanadium, aluminium and iron that may be present in the titanium-bearing material, substantially leaving the titanium content in the first leach solids. The leaching step is carried out at atmospheric (ambient) pressure i.e. it is not necessary to conduct the leaching step under pressure. The leach is carried out under conditions such that titanium leached from the titanium-bearing ore material substantially remains in the titanium-bearing material (the solid) i.e. the titanium does not leach into solution. In this step, the leach conditions are selected to leach the majority of the vanadium and aluminium content of the titanium-bearing material into solution. No titanium extraction and recovery steps are therefore required in the associated processing stream. To achieve this, the first leaching step is conducted with the first lixiviant comprising less than 23% w/w HCl solution, preferably 20 to 22% w/w. The temperature of the leach is between 70 to 97° C., and preferably between 85 to 97° C.

The first leaching step may be conducted continuously as a co-current step, a countercurrent step or in another manner, or the leaching step may be conducted as a batch step.

A value metal-rich solution (first leach liquor) is obtained in the first leaching step. The residue (undissolved first leach solids) may be in the form of a suspension. The leach mixture is fed to a solid/liquid separation step to effect separation of the first leach liquor from the first leach solids e.g. leach residue and other gangue. Techniques for such separation are known in the art for example using a pressure or vacuum filter, counter-current decantation, thickener or centrifuge.

The titanium-bearing material may also include one or more additional value metals such as iron, vanadium, manganese, magnesium or aluminium. Other trace elements, species or impurities may also be present. The process of the present invention can therefore include steps of removing and recovering any iron, vanadium, manganese, magnesium or aluminium from the leach liquor in this first leach processing stream. In these embodiments, the first leach liquor is subjected to steps to recover the at least one value metal therefrom.

In exemplary embodiments, the value metals in the titanium-bearing material include at least vanadium and/or aluminium. In such embodiments, the process further comprises a vanadium and/or aluminium removal step comprising:
 adding a neutralising agent, preferably at least one of limestone, lime or MgO, to the first leach liquor at a temperature of 50 to 80° C. under an inert gas or nitrogen atmosphere, to raise the pH of the liquor to 3 to 6 thereby precipitating vanadium and aluminium to produce a V/Al removed slurry; and
 separating the V/Al removed slurry into a liquid fraction comprising a V/Al removed liquor and a solid fraction comprising the V/Al precipitated solid.

Vanadium and/or aluminium separation from the first leach liquor is therefore a precipitation technique resulting for a pH rise of the liquor caused by the addition of limestone, lime or MgO. In comparison, most prior art processes separate vanadium using more expensive solvent extraction techniques.

This process step is preferably conducted under an inert gas or nitrogen atmosphere, preferably under a nitrogen blanket to prevent oxidation of ferrous iron to ferric iron and hinder precipitation of any iron content (in the form of ferric iron) that may be in the first leach liquor. Vanadium and/or aluminium precipitation is preferably conducted prior to removal/recovery of other value metals that may be in the first leach liquor.

Recovery of vanadium and aluminium from the V/Al precipitated solid can be conducted by any suitable method known in the art, for example by leaching using either an ammonia or HCl solution, followed by precipitation and optional calcination steps. The details of these process steps are described in more detail later in the specification.

As noted above, the titanium-bearing material may include an iron content (i.e. one of the value metals), for example where the titanium-bearing material is a titaniferous ore or concentrate thereof. Alternatively, or in addition, the first leach liquor may include an iron content from Fe addition at some point in the first leach process stream. In such embodiments, Fe powder is added because Fe(III) is present in the leach liquor. Fe powder reduces Fe(III) to Fe(II) and Fe(II) does not precipitate and remains in solution during V/Al reduction due to the nitrogen blanket. In these embodiments, the process can further comprise an iron removal step comprising:
  adding a neutralising agent and an oxidant to the first leach liquor at a temperature of 70 to 90° C. to raise the pH of the liquor to 4 to 7 thereby precipitating iron to produce an iron removed slurry; and
  separating the iron removed slurry into a liquid fraction comprising an iron removed liquor and a solid fraction comprising the iron precipitated solid.

The neutralising agent can comprise any suitable neutralising species or compound, and preferably comprises at least one of limestone, lime or MgO.

The oxidant can comprise one of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid, an oxygen containing gas such as air or oxygen, other non-sulphur containing oxidants, or mixtures thereof. Preferred oxidants are $H_2O_2$ or an oxygen containing gas, such as oxygen, air, or the like. The most preferred oxidant is oxygen or air.

The iron removal solid can comprise one or more of magnetite, goethite, hematite and akageneite. However, magnetite is the preferred form for the iron removed solid. Thus, in exemplary embodiments, iron is substantially precipitated as magnetite, preferably precipitated as magnetite only. The iron precipitate, preferably mainly magnetite, can be used to produce Fe powder for example by reacting the precipitated magnetite with carbon/charcoal/coke/coal at high temperature, ~800 to 1000° C. The Fe powder produced can be recycled for use in the process, for example in the second leach process stream or the optional reduction step of the first leach process stream.

In the overall first leach process stream, the iron removal step is preferably conducted after the vanadium and/or aluminium removal step.

The titanium-bearing material may also include a manganese and/or magnesium (i.e. one of the value metals). Alternatively, or in addition, the first leach liquor may include a manganese and/or magnesium content from Mg or Mn addition at some point in the first leach process stream, for example MgO addition. In these embodiments, the process further comprises a manganese and/or magnesium removal step comprising:
  adding a neutralising agent, lime, and an oxidant, preferably $H_2O_2$ or an oxygen containing gas, more preferably air, to the iron removed liquor at a temperature of 60 to 90° C. to raise the pH of the liquor to 9 to 10 thereby precipitating Mg and/or Mn to produce a Mg/Mn removed slurry; and
  separating the removed Mg/Mn slurry into a liquid fraction comprising a Mg/Mn removed liquor and a solid fraction comprising the precipitated Mg and/or Mn solid.

The precipitation step is conducted in the presence of an oxidant, which may be oxidant, preferably $H_2O_2$ or an oxygen containing gas such as oxygen, air or similar for the oxidation of Mn(II) to Mn(IV). In this step, lime is preferably used as the neutralisation agent. The precipitated Mg and/or Mn solid will typically comprise $Mg(OH)_2$ and a mixture of Mn-oxide/hydroxide. The Mg/Mn removed liquor which will be mainly a chloride solution, for example calcium chloride where limestone and/or lime is used in the preceding steps. In the overall first leach process stream, the manganese and/or magnesium removal step is preferably conducted after the iron removal step.

To assist with process economics, it is preferable that the first lixiviant is regenerated and recycled to the first leaching step. In these embodiments, the process further comprises:
  regenerating the first lixiviant and recycling the first lixiviant to the first leaching step.

In embodiments, the first lixiviant is regenerated by:
  concentrating the chloride content of the Mg/Mn removed liquor through water removal, preferably boiling and/or evaporation, to produce an evaporated liquor;
  reacting the evaporated liquor with at least 98% w/w sulphuric acid at a temperature of 30 to 90° C., preferably at 80 to 85° C. under atmospheric conditions to produce 20 to 22% w/w hydrochloric acid and a solid precipitate,
  separating the precipitated solid and hydrochloric acid liquor; and
  recycling the hydrochloric acid liquor to the first leaching step.

The composition of the chloride content will depend on the composition of the additives to this first leach process stream. In many cases, the chloride content will comprise a calcium chloride solution/liquor. The evaporated liquor will therefore comprise a calcium chloride liquor. In such embodiments, the evaporated liquor is reacted with concentrate sulphuric acid (98% w/w) at a stoichiometric ratio of calcium chloride to sulphuric acid to produce HCl and a precipitate comprising at least one of gypsum, hemihydrate or an anhydrite compound. Furthermore, in these embodiments the reaction between the evaporated liquor and concentrate sulphuric acid is preferably performed in a temperature range of 80 to 85° C. aiming to precipitate anhydrite only.

The first leach process stream preferably includes a number of treatment processes prior to value metal recovery steps, more particularly prior to the vanadium and/or aluminium precipitation step. In these embodiments, the process further comprises the following steps prior to precipitating vanadium and/or aluminium from the first leach liquor:
  neutralising at least part of the free acid (HCl) in the first leach liquor by adding to the first leach liquor at least one of: the feed titanium-bearing material (preferably titanium ore concentrate), limestone, lime or MgO, to produce a first liquor neutralised slurry including a neutralised leach solid; and separating the first liquor neutralised slurry into a solid fraction comprising the neutralised leach solid and a liquid fraction comprising the neutralised first leach liquor.

It should be appreciated that other neutralisation agents could also be used such as sodium hydroxide or the like. In some embodiments, the first leach liquor neutralisation stage solid or leach solid (when ore is used) is fed into the first leaching stage.

The first leach process stream preferably includes the following steps following the neutralising steps:

reduction of the neutralised first leach liquor at 45 to 75° C. by the addition of metallic iron, preferably iron powder, to convert ferric chloride in the first leach liquor to ferrous chloride; and separating the reduced first leach liquor into a liquid fraction comprising a reduced liquor and a solid fraction comprising any unreacted solid iron powder.

Reduction is preferably conducted under an inert gas or nitrogen atmosphere, preferably under a nitrogen blanket and achieves an oxidation-reduction potential (ORP) of the liquor below 100 mV.

Second Leach Process Stream

The second leaching step and associated second leach process stream is substantially focused on effective titanium recovery in the form of titanium dioxide (rutile or anatase). The specific recovery steps and conditions depends on the composition of the titanium-bearing material and thus the processes required to recover titanium dioxide and to regenerate the lixiviant used in the second leaching step.

The second leaching step is carried out at atmospheric (ambient) pressure i.e. it is not necessary to conduct the leaching step under pressure. The leach is carried out under conditions such that titanium leached from the titanium-bearing ore material is leached into solution and remains in solution during the leach i.e. the titanium does not precipitate as, for example titanium dioxide. In particular, the leach is carried out at a temperature of less than or equal to 80° C., typically between 60 to 80° C. and most preferably at a temperature in the range of 70 to 80° C. The leach is carried out with the second lixiviant in the presence of a Fe powder reductant. The second leaching step is preferably conducted for 2 to 6 h, and in some embodiments 4 to 6 h.

The second leaching step may be conducted continuously as a co-current step, a counter-current step or in another manner, or the leaching step may be conducted as a batch step.

The second lixiviant comprises a mixed chloride solution comprising less than 23% w/w hydrochloric acid and an additional chloride selected from alkali metal chlorides, magnesium chloride and calcium chloride, or mixtures thereof. In embodiments, the mixed chloride solution comprises 20 to 22% w/w HCl and the additional chloride has a total chloride concentration of 400 to 550 g/L (calculated on the basis of the amounts of chloride and hydrochloric acid in the lixiviant solution). It should be appreciated that the metal chloride/HCl (metal to hydrochloric acid) ratio in the leach is preferably adjusted to optimize the leach, based on for example the particular ore being leached and temperature. The upper limit on the chloride concentration may depend on the ions present in the leach solution, especially as a result of leaching of the ore, and resultant formation of complexes.

In the second leaching step, the additional chloride is selected from alkali metal chlorides, magnesium chloride and calcium chloride, or mixtures thereof. In exemplary embodiments, the chloride is preferably calcium chloride, such that hydrochloric acid is regenerated and a mixed chloride solution containing hydrochloric acid and unreacted calcium chloride is recycled in the process. However, it should be appreciated that other chlorides such as magnesium chloride could equally be used.

In particularly preferred embodiments of the invention, the chloride is derived from calcium chloride and hydrochloric acid, and the chloride concentration of 400 to 550 g/L is calculated on the basis of the amounts of calcium chloride and hydrochloric acid in the lixiviant solution. In embodiments, the amount of hydrochloric acid is in the range of 255 to 280 g/L and the amount of calcium chloride is in the range of 300 to 400 g/L. For clarity, the concentration 255 to 280 g/L HCl gives ~20 to 22% w/w HCl in HCl and $CaCl_2$) mixed chloride solution where liquor SG is quite high ~1.3. In case of water in HCl, 20 to 22% w/w HCl will be ~220 g/L to 240 g/L of HCl.

A value metal-rich solution (second leach liquor) is obtained in the second leaching step. The residue (undissolved second leach solids) may be in the form of a suspension. The leach mixture is fed to a solid/liquid separation step to effect separation of the second leach liquor from the second leach solids, for example leach residue and other gangue. Techniques for such separation are known, for example using a pressure or vacuum filter, counter-current decantation, thickener or centrifuge.

For example, where the titanium-bearing material is a titanium-bearing ore or concentrate thereof, the first leach solid will typically contain mostly titanium-bearing mineral such as ilmenite and any precipitated rutile, pseudo-rutile, anatase, etc. along with the gangue minerals remained undissolved during first leaching. Leaching conditions in this second leaching step can be tailored to assist the dissolution of each of these titanium-bearing minerals. Thus, in some embodiments the second leaching step includes two leach regimes, comprising:

a first leach regime performed in the mixed chloride solution (without any iron powder addition); and a second leach regime performed in the mixed chloride solution with iron powder addition.

The second leach reaction can be performed as a two-stage reaction. Here, the first leach regime and the second leach regime of the second leaching step can be conducted as successive leaching steps in (i) the same leach stage/vessel; or (ii) separate leach stages/vessels. In embodiments, the first leach regime is performed for a duration of 1 to 2 h and the second leach regime for a duration of 1 to 4 h. In some embodiments, the first leach regime is performed for a duration of 1 to 2 h and the second leach regime for a duration of 2 to 4 h.

The first leach regime is used for the dissolution of major portion of ilmenite mineral. The second leach regime with Fe aims to dissolve the remaining un-reacted ilmenite and other Ti bearing minerals or precipitated solid from the first leaching step such as rutile, pseudo-rutile, anatase, or the like under the reducing atmosphere. The iron powder will also reduce the ferric iron present in the leach liquor to ferrous iron during leaching reaction. If required, an additional small amount of fresh second lixiviant (mixed chloride solution) can be added in the second stage second leach to stabilise dissolved metals and additional iron coming from the added Fe powder.

Following leaching, the second leaching process stream includes processes for the recovery of dissolved titanium and iron from the leach liquor and the regeneration of the lixiviant HCl and $CaCl_2$) mixed solution.

The iron content of the treated second leach liquor is removed by adding a neutralising agent and an oxidant to the V/Al removed liquor at a temperature of 70 to 90° C. to raise the pH of the liquor to 4 to 8 thereby precipitating iron to produce an iron removed slurry; and separating the iron removed slurry into a liquid fraction comprising an iron removed liquor and a solid fraction comprising an iron precipitated solid. The neutralising agent can comprise any suitable neutralising species or compound, and preferably comprises at least one of limestone, lime or MgO. The oxidant can comprise one of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid, an oxygen containing gas such as air or oxygen, other non-sulphur containing oxidants, or mixtures thereof. Preferred oxidants are $H_2O_2$ or an oxygen containing gas, such as oxygen, air, or the like. The most preferred oxidant is oxygen or air. The iron removal solid can comprise one or more of magnetite, goethite, hematite and akageneite. However, magnetite is the preferred form for the iron removed solid. Again, in exemplary embodiments, iron is substantially precipitated as magnetite, preferably precipitated as magnetite only.

The iron precipitate, preferably mainly magnetite can be used to produce Fe powder for example by reacting the precipitated magnetite with carbon/charcoal/coke/coal at high temperature, ~800 to 1000° C. The Fe powder produced can be recycled for use in the process, for example in the second leach process stream or the optional reduction step of the first leach process stream.

In some embodiments, the titanium content of the second leach liquor may include a Ti(III) content. In order to recover titanium dioxide, it is preferred that any Ti(III) content is converted to Ti(IV) prior to the titanium dioxide precipitation step. In these embodiments, the process therefore further comprises the step of:
  introducing an oxidant into the second leach liquor prior to titanium dioxide precipitation step to oxidise any Ti(III) content to Ti(IV) by controlling the oxidation reduction potential of the second leach liquor within 100 to 200 mV,
  wherein the oxidant is selected from air, oxygen, alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid, other non-sulphur containing oxidants, or mixtures thereof.

Examples of alkali metal peroxide are sodium peroxide and potassium peroxide. Examples of alkali metal perchlorates are sodium perchlorate and potassium perchlorate. Ammonium perchlorate, magnesium perchlorate and magnesium chlorate may also be used. Examples of alkali metal chlorates are sodium chlorate and potassium chlorate. An example of an alkali metal hypochlorite is sodium hypochlorite. Other oxidants are non-sulphur containing oxidants; the presence of sulphur in oxidants is to be avoided. The preferred oxidants are selected from the group consisting of air, oxygen, chlorine, sodium chlorate, sodium perchlorate, hydrogen peroxide, perchloric acid and mixtures thereof. In exemplary embodiments, the oxidant comprises hydrogen peroxide, and in some embodiments, dilute hydrogen peroxide.

Thereafter, titanium dioxide can be recovered using a precipitation step in which heated or boiling water is added to the second leach liquor under an inert gas or nitrogen atmosphere to raise the temperature of the second leach liquor to 85 to 100° C. to produce a treated second leach liquor and a titanium dioxide containing solid. This titanium dioxide precipitation step preferably comprises hydrolysing the Ti(IV) content of the second leach liquor to precipitate as titanium dioxide ($TiO_2$) solid. The reaction is to perform under an inert gas or nitrogen atmosphere (such as a nitrogen blanket) to prevent oxidation of ferrous iron to ferric iron and precipitation of ferric iron with $TiO_2$ during the washing stages of $TiO_2$. The Ti(IV) hydrolysis will release HCl in the solution. In embodiments, the HCl can partially be neutralised by adding at least one of a limestone, lime or MgO slurry to maximise $TiO_2$ recovery.

The ferrous iron liquor may be subjected to an optional V/Al removal depending on the V and/or Al concentrations in the $TiO_2$ precipitated liquor adopting the identical procedure as explain for the first leaching process stream. In these embodiments, the second leach process stream further comprising the steps of:
  adding a neutralising agent, preferably at least one of limestone, lime or MgO, to the treated second leach liquor at a temperature of 50 to 80° C. under an inert gas or nitrogen atmosphere, to raise the pH of the liquor to 3 to 6 thereby precipitating vanadium and aluminium to produce a V/Al removed slurry; and
  separating the V/Al removed slurry into a liquid fraction comprising a V/Al removed treated second leach liquor and a solid fraction comprising the V/Al precipitated solid.

Again, V/Al removal is conducted under an inert gas or nitrogen atmosphere, preferably under a nitrogen blanket to prevent oxidation of ferrous iron to ferric iron and precipitation of ferric iron in that step.

As previously noted for the first leach process stream, recovery of vanadium and aluminium from the V/Al precipitated solid can be conducted by any suitable method known in the art, for example by leaching using either an ammonia or HCl solution, followed by precipitation and optional calcination steps. The details of these process steps are described in more detail later in the specification.

Where applicable, a Mg/Mn removal can also be applied to the second leach stream. In these embodiments, the second process stream further comprises the steps of:
  adding a neutralising agent, preferably lime, and an oxidant, preferably $H_2O_2$ or an oxygen containing gas, more preferably air, to the iron removed liquor at a temperature of 60 to 90° C. to raise the pH of the liquor to 9 to 10 thereby precipitating Mg and/or Mn to produce a Mg/Mn removed slurry; and
  separating the removed Mg/Mn slurry into a liquid fraction comprising an Mg/Mn removed liquor and a solid fraction comprising the precipitated Mg and/or Mn solid.

In this step, lime is preferably used as the neutralisation agent. The oxidant preferably $H_2O_2$ or an oxygen containing gas such as air is added to assist the oxidation of Mn(II) to Mn(IV). The precipitated Mg and/or Mn solid will typically comprise $Mg(OH)_2$ and a mixture of Mn-oxide/hydroxide. The Mg/Mn removed liquor which will be mainly calcium chloride solution.

To assist with process economics, the second lixiviant is regenerated and recycled to the second leaching step. This step of regenerating the second lixiviant for recycle to the second leaching step preferably comprises:
  concentrating the chloride content of the treated second leach liquor through water removal, preferably boiling and/or evaporation, to produce a concentrate chloride solution (in some cases having a concentration lower than its saturation concentration);

reacting the evaporated liquor with at least 98% w/w sulphuric acid at a temperature of 30 to 90° C., preferably at 80 to 85° C. under atmospheric conditions to produce a mixed chloride solution having 20 to 22% w/w hydrochloric acid, an additional chloride content in the solution and a solid precipitate, separating the precipitated solid from the mixed chloride solution; and recycling the mixed chloride solution to the second leaching step.

The composition of the chloride content will depend on the composition of the additives that have been fed into this second leach process stream. In many cases, the chloride content will comprise a calcium chloride solution/liquor. The evaporated liquor will therefore comprise a calcium chloride liquor. In such embodiments, the evaporated liquor comprises a calcium chloride liquor in some cases having a concentration lower than its saturation concentration, and the evaporated liquor is reacted with concentrate sulphuric acid (98% w/w) at a stoichiometric ratio of calcium chloride to sulphuric acid to produce HCl and a precipitate comprising at least one of gypsum, hemihydrate or an anhydrite compound.

In the present invention, the HCl regeneration step focusses on typically 20 to 22% w/w HCl from $CaCl_2$) solution by reacting with concentrate $H_2SO_4$ at temperature, preferably more than 75° C. to produce mainly anhydrite calcium sulphate or as a mixture of anhydrite, hemi-hydrate and di-hydrate calcium sulphate. In embodiments where the chloride content comprises calcium chloride, the reaction between the evaporated liquor and concentrate sulphuric acid is preferably performed in a temperature range of 80 to 85° C. aiming to precipitate anhydrite only.

The process stages of the first leach liquor treatment steps and the second leach liquor treatments steps can be combined for at least one of the vanadium and/or aluminium removal step; iron removal step; or manganese and/or magnesium removal step in some embodiments. In some embodiments, all or the common stages for both the first leach process stream and the second leach process stream including V/Al removal, Fe removal and Mg/Mn removal are combined to perform at one common process stream to reduce the capital investment and also the operation cost.

It should be appreciated that separation of solid and liquid elements in the process can be performed using any suitable method. Techniques for such separation are known for example using a pressure or vacuum filter, counter-current decantation, thickener or centrifuge.

In some embodiments, the process of the present invention includes a sulphuric acid production plant that produces sulphuric acid from elemental sulphur. This additional process can provide significant energy credit for power generation and heat required for various steps in the process.

In some embodiments, the neutralising agent in the various process steps/stages comprises MgO. In these embodiments, the process typically further comprises a Mg removal step in which $Mg(OH)_2$ is precipitated using lime and an MgO regeneration stage in which the $Mg(OH)_2$ is calcined preferably at 300 to 400° C. to regenerate MgO for recycling as the neutralising agent in the process.

A second aspect of the present invention provides a process system for recovering titanium dioxide from a titanium-bearing material, the system including the steps of:
a first leaching vessel for leaching the titanium-bearing material in a first leaching step at atmospheric pressure and at a temperature of 70 to 97° C. with a first lixiviant to produce a first leach solution comprising undissolved first leach solids that include a titanium content and a first leach liquor, the first lixiviant comprising hydrochloric acid at a concentration of less than 23% w/w;
a first solid-liquid separator for separating the first leach liquor and the undissolved first leach solids;
a second leaching vessel for leaching the first leach solids in a second leaching step at atmospheric pressure and at a temperature of 60 to 80° C. with a second lixiviant and a Fe powder reductant additive to produce a second leach solution comprising undissolved second leach solids and a second leach liquor that includes a leached titanium content and iron content, the second lixiviant comprising a mixed chloride solution comprising less than 23% w/w hydrochloric acid and an additional chloride selected from alkali metal chlorides, magnesium chloride and calcium chloride, or mixtures thereof;
a second solid-liquid separator for separating the second leach liquor and the undissolved second leach solids;
a first precipitation vessel for precipitating titanium dioxide from the second leach liquor by addition of heated or boiling water under an inert gas or nitrogen atmosphere to raise the temperature of the second leach liquor to 85 to 100° C. to produce a treated second leach liquor and a titanium dioxide containing solid;
separating the titanium dioxide containing solid from the treated second leach liquor;
a second precipitation vessel precipitating the iron content from the treated second leach liquor by adding a neutralising agent and an oxidant to the treated second leach liquor at a temperature of 70 to 90° C. to raise the pH of the second leach liquor to 4 to 8 to produce an iron removed slurry comprising an iron removed second leach liquor and an iron precipitated solid;
a third solid-liquid separator for separating the iron removed second leach liquor from the iron precipitated solid; and
a regenerator stage for regenerating the second lixiviant for recycle to the second leaching step,
thereby recovering the titanium from the second leach solution as titanium dioxide.

In this second aspect, the neutralising agent added in the second precipitation vessel can comprise any suitable neutralising species or compound, and preferably comprises at least one of limestone, lime or MgO. Furthermore, the oxidant in the second precipitation vessel can comprise one of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid, an oxygen containing gas such as air or oxygen, other non-sulphur containing oxidants, or mixtures thereof. Preferred oxidants are $H_2O_2$ or an oxygen containing gas, such as oxygen, air, or the like. The most preferred oxidant is oxygen or air.

It should be appreciated that the process system of the second aspect of the present invention can perform the process of the first aspect of the present invention. The features and additional process steps/stages taught for the first aspect of the present invention equally apply to this second aspect of the present invention.

A third aspect of the present invention provides a plant which includes a process according to the first aspect of the present invention.

The present invention also provides in a fourth aspect a titanium dioxide produced from the process according to the first aspect of the present invention.

Some advantages of this two-stage leaching process are as follows:

i) The process of the present invention is based on atmospheric precipitation techniques below 100° C., which implies low capital investment compared to the process having high temperature extraction processes and/or solvent extraction process step.

ii) No specialised material of construction is required for the reactor design criteria in this process. Standard fibre glass and/or high-density polyethylene (HDPE) and/or polypropylene (PP) tanks can be used to meet the reactor/equipment requirement. Compared to prior art pyro-hydrolysis or high temperature hydrolysis technique, the lixiviant regeneration in the present invention is a simpler process where energy requirement is low and the material of construction is not critical (i.e. not requiring high temperature operation and high temperature corrosion resistant materials).

iii) The whole process operates with low or reduced concentration of hydrochloric acid within a concentration range of 20 to 22% w/w HCl.

iv) The HCl required in the process is regenerated from the process liquor containing calcium chloride under atmospheric conditions using sulphuric acid.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

The process of the present invention relates to the recovery of titanium dioxide from a titanium-bearing material. The "titanium-bearing material" can be any material including material containing titanium species are such as titanium-bearing ore. Titanium can be found in a variety of titanium-bearing minerals including ilmenite ($FeO \cdot TiO_2$ or $TiFeO_3$), rutile ($TiO_2$), anatase ($TiO_2$) and/or leucoxene ($Fe_2O_3 \cdot nTiO_2$). Such titanium-bearing material may typically also include iron, vanadium, aluminium and manganese, which can also be solubilised in a lixiviant applied during a leaching step. The titanium-bearing material can be a titanium-bearing ore material including titanium-bearing ore or orebody, concentrate thereof, modified, ore thereof and tailings thereof, and mixtures thereof. The titanium-bearing material can also be a material including vanadium associated with titanium minerals such as titano-magnetite, vanadium bearing minerals, and titanium-bearing leach residues and slags. However, it should be appreciated that the invention should not be limited to any one of those materials and could comprise other materials that include a titanium or titanium species content.

The described process in the present invention is a two-stream leaching process (designated Stream-1 and Stream-2 in FIG. 1 and the associated description) to treat the titanium-bearing ore, concentrate etc., where each stream can be operated independently on its own having respective dissolved value metals recovery and HCl lixiviant regeneration. A process is described to recover value metals including titanium, vanadium, aluminium and iron from titanium-bearing feed materials through the hydrochloric acid (HCl) leaching and the mixed solution of hydrochloric acid and an additional chloride leaching. The overall process is described to operate in reduced HCl concentration, below 23% w/w HCl, through the two leach process streams.

Figure 1:
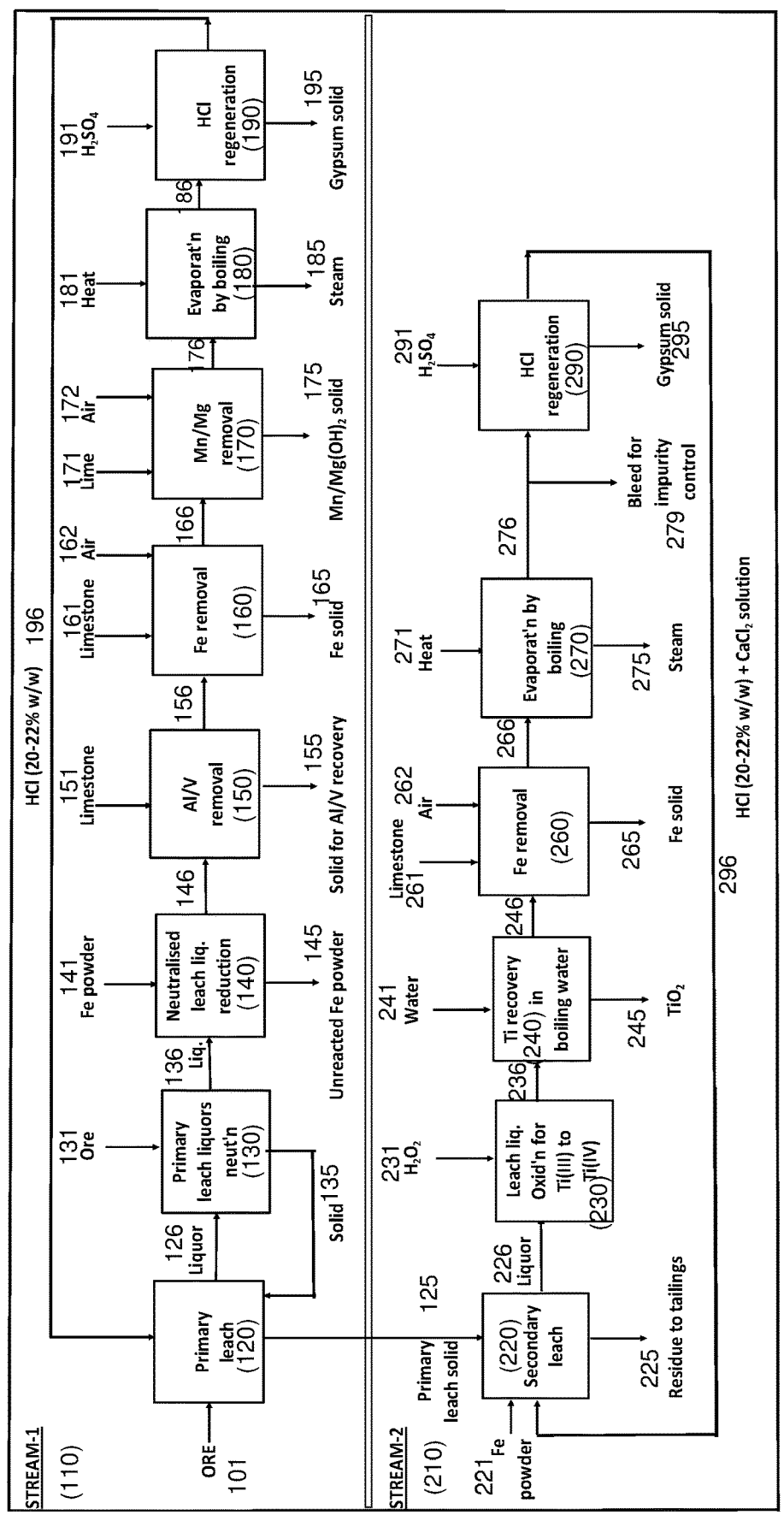
FIG. 1 is a general flow diagram showing the process steps for one preferred embodiment of the process according to the present invention.

FIG. 1 shows the general flow diagram of one embodiment of the process of the present invention showing a two-step leaching process 100 for the recovery of titanium dioxide from a titanium-bearing ore or ore concentrate 101. As discussed above, the titanium-bearing ore or ore concentrate 101 includes titanium, and in this case additional value metals including iron, vanadium, manganese, magnesium and aluminium. The process described and illustrated has been tailored to recover the titanium content and each of those value metals. It should be appreciated that different process steps may be used depending in the value metal composition of a particular titanium-bearing material. The process of the present invention can therefore include but should not be strictly limited to the following steps:

Stream-1 (First Leach Process Stream):

The process for the first leach process stream 110 (Stream-1) is as follows:

i) A first leaching step 120 of the titanium-bearing material, in this embodiment a titanium-bearing ore 101, is conducted in a first lixiviant solution comprising 20 to 22% w/w HCl at 70 to 97° C., preferably at 85 to 97° C. to leach the impurities including vanadium leaving the titanium value in the first leach solid (solid leach residue). The leaching process is followed by solid-liquid separation (part of step 120) of the first leach slurry to separate the first leach solids 125 and first leach liquor 126. The first leach solid 125 will contain mostly Ti bearing mineral such as ilmenite and any precipitated rutile, pseudo-rutile, anatase, etc. along with the gangue minerals remained undissolved during first leaching. The first leach solid 125 is treated further in the second leach process stream 210 (Stream-2), described in more detail below.

ii) The excessive free acid (HCl) remaining in the first leach liquor 126 after first leaching is preferably neutralised in neutralisation stage 130 conducted at a temperature of 70 to 97° C. Here the first leach liquor 126 is fed into a neutralisation vessel, a neutralisation agent 131 is added to minimise the free acid concentration in the first leach liquor below 5 g/L (pH<0.5). The neutralisation agent 131 is preferably the feed Ti bearing ores or concentrate to minimise the free acid concentration in the first leach liquor 126. However, another neutralisation agent such as limestone, lime of MgO could be used, with the knowledge that reagent consumption may be high to achieve the required pH. However, initial neutralisation agent 131 is preferably the feed Ti bearing ores or concentrate followed by minor amount of other neutralisation agent such as limestone, lime of MgO could be used to achieve the required pH in the first leach liquor. A solid-liquid separation is then conducted of the first liquor neutralised slurry to provide a solid 135, which is fed to the first leaching stage 120 and an acid neutralised first leach liquor 136 which is to a Fe powder reduction stage 140.

iii) In the Fe powder reduction stage 140, the acid neutralised first leach liquor 136 is reduced at 45 to 75° C. under nitrogen blanket through the addition of metallic Fe powder 141 to the convert ferric chloride present in the liquor to ferrous chloride. The step is conducted to achieve an oxidation-reduction potential (ORP) of the liquor below 100 mV. A solid-liquid separation is then conducted of the produced reduced first leach liquor to remove any unreacted solid Fe powder 145 and to obtain a reduced liquor 146. The unreacted solid Fe powder 145 can be recycled for use in the reduction stage 140.

iv) The reduced liquor 146 is then fed into a vanadium and aluminium removal stage 150 in which vanadium and aluminium are precipitated from the reduced liquor 146 under nitrogen blanket by raising pH of the reduced liquor 146 to ~3-6 at 50 to 80° C. by adding limestone or lime as the neutralising agent 151. A solid-liquid separation is then conducted of the produced vanadium (V) and aluminium (Al) removed slurry to separate precipitated solid 155 and the V/Al removed liquor 156.

v) Recovery of V as vanadium pentoxide ($V_2O_5$) from the V/Al precipitated solid 155 can be by any suitable recovery process known in the art. In preferred embodiments, V as vanadium pentoxide ($V_2O_5$) can be recovered from the V/Al precipitated solid 155 in a recovery process (not illustrated) by leaching the precipitate in ammonia solution at higher temperature to solubilise V as ammonium meta-vanadate followed by solid-liquid separation of the slurry to separate ammonium meta-vanadate solution and Al rich undissolved solid. The ammonium meta-vanadate is precipitated by cooling the hot solution and the slurry is filtered for solid-liquid separation. The ammonium meta-vanadate solid is calcined above 250° C. to produce $V_2O_5$ product. Alternatively, V can be recovered vanadium pentoxide ($V_2O_5$) from the V/Al precipitated solid 155 in an alternative recovery process (not illustrated) by leaching the precipitate in HCl solution at ~50 to 80° C. to solubilise both V and Al followed by solid-liquid separation to obtain a clean liquor. The prepared V and Al leach liquor can be treated with an organic solvent Cyanex 372 to extract V into organic solvent leaving Al in the raffinate liquor. The V loaded organic is stripped with HCl solution to obtain V rich stripped liquor and the regenerated organic is recycled to extraction stage after washing. The V strip liquor is further treated with ammonia to precipitate V as ammonium meta-vanadate and the slurry is filtered for solid-liquid separation. The ammonium meta-vanadate precipitate is washed and calcined above 250° C. to produce $V_2O_5$ product.

vi) The V/Al removed liquor 156 is fed to an iron recovery stage 160 in which iron is precipitated from the V/Al removed liquor 156 at a temperature of 70 to 90° C. through the addition of limestone or lime as the neutralising agent 161 in the presence of air 162 (an oxidant for the precipitation reaction) to change the solution pH to ~4 to 7. The precipitated iron removal solid 165 mostly comprises magnetite, goethite, hematite and akageneite. However, magnetite is the most preferable precipitated from this stage, and as such conditions are preferably optimised to substantially precipitate magnetite. A solid-liquid separation is then conducted of the produced iron removed slurry to separate the precipitated Fe solid 165 and the Fe removed liquor 166.

vii) The iron removed liquor 166 is then fed into a Mg and Mn removal stage 170 in which magnesium and/or manganese is precipitated from the liquor at a pH ~9 to 10 and at a temperature of 60 to 90° C. using lime as a neutralising agent 171 and air 172 as an oxidant typically for the oxidation of Mn(II) to Mn(IV). The precipitated Mg/Mn removal solid 175 will comprise $Mg(OH)_2$ and a mixture of Mn-oxide/hydroxide. A solid-liquid separation is then conducted of the produced Mg and Mn removed slurry to separate precipitated solid 175 and the Mg/Mn removed liquor 176 which will be mainly calcium chloride solution.

viii) The Mg/Mn removed liquor 176 having mainly calcium chloride is fed into an evaporation stage 180 to evaporate a water content to get a suitable calcium chloride concentration prior to the subsequent HCl regeneration stage 190. Evaporation is typically achieved by heating/boiling the Mg/Mn removed liquor 176 through the addition of heat 181.

ix) The evaporated calcium chloride liquor 186 is reacted with concentrate sulphuric acid (98% w/w) 191 in regeneration stage 190 at a stoichiometric ratio of calcium chloride to sulphuric acid, to produce 20 to 22% w/w hydrochloric acid and precipitate calcium as gypsum, hemihydrate, anhydrite compounds or mixture of these compounds. The reaction can be performed at a temperature range of 30 to 90° C. under atmospheric conditions. The reaction between the evaporated liquor 186 and concentrate sulphuric acid 191 is preferably performed in a temperature range of 80 to 85° C. aiming to precipitate anhydrite only. A solid-liquid separation is then conducted of the produced regenerated hydrochloric acid slurry to separate precipitated solid 195 and hydrochloric acid liquor 196, which is recycled back to the first leach stage 120 for use as the first lixiviant solution.

Stream-2 (Second Leach Process Stream):

The process for the second leach process stream 210 (Stream-2) is as follows:

i) A second leaching stage 220 of the first leach solid 125 from the first leach stage 120 is conducted using a mixed chloride second lixiviant solution of 20 to 22% w/w HCl and calcium chloride ($CaCl_2$)) solution having a total chloride concentration of 400 to 550 g/L at 60 to 80° C., preferably at 70 to 80° C., for 4 to 6 h duration with Fe powder addition. Fe powder 221 is added to provide a reducing atmosphere to obtain higher Ti extraction from the first leach solid 125, and assist the dissolution of Ti minerals such as ilmenite, rutile, pseudo-rutile, anatase, and the like. The leaching process is followed by solid-liquid separation (part of step 220) of the resulting second leach slurry to separate the second leach solids 225 and second leach liquor 226. The second stage second leach slurry/solid 225 exits the process as tailing. The second leach liquor 226 is fed into the subsequent process steps of the second leach process stream 210.

In some embodiments, the Fe powder 221 is added throughout the entire 4 to 6 hour leach. In other embodiments, the second leaching stage 220 is conducted as two separate leaching regimes. In these embodiments, a first leaching regime (initial second leaching) will be performed for 1 to 2 h in mixed chloride solution without any Fe powder 221 addition for the dissolution of major portion of ilmenite mineral. This is followed by a second leaching regime comprising a continuation of the leaching in mixed chloride solution for another 2 to 4 h duration with Fe powder 221 addition to dissolve the remaining un-reacted ilmenite and other Ti bearing minerals from the first leach solid 125 such as rutile, pseudo-rutile, anatase, etc. under the reducing atmosphere. The Fe powder 221 will also reduce the ferric iron present in the leach liquor to ferrous iron during leaching reaction.

Figure 2:
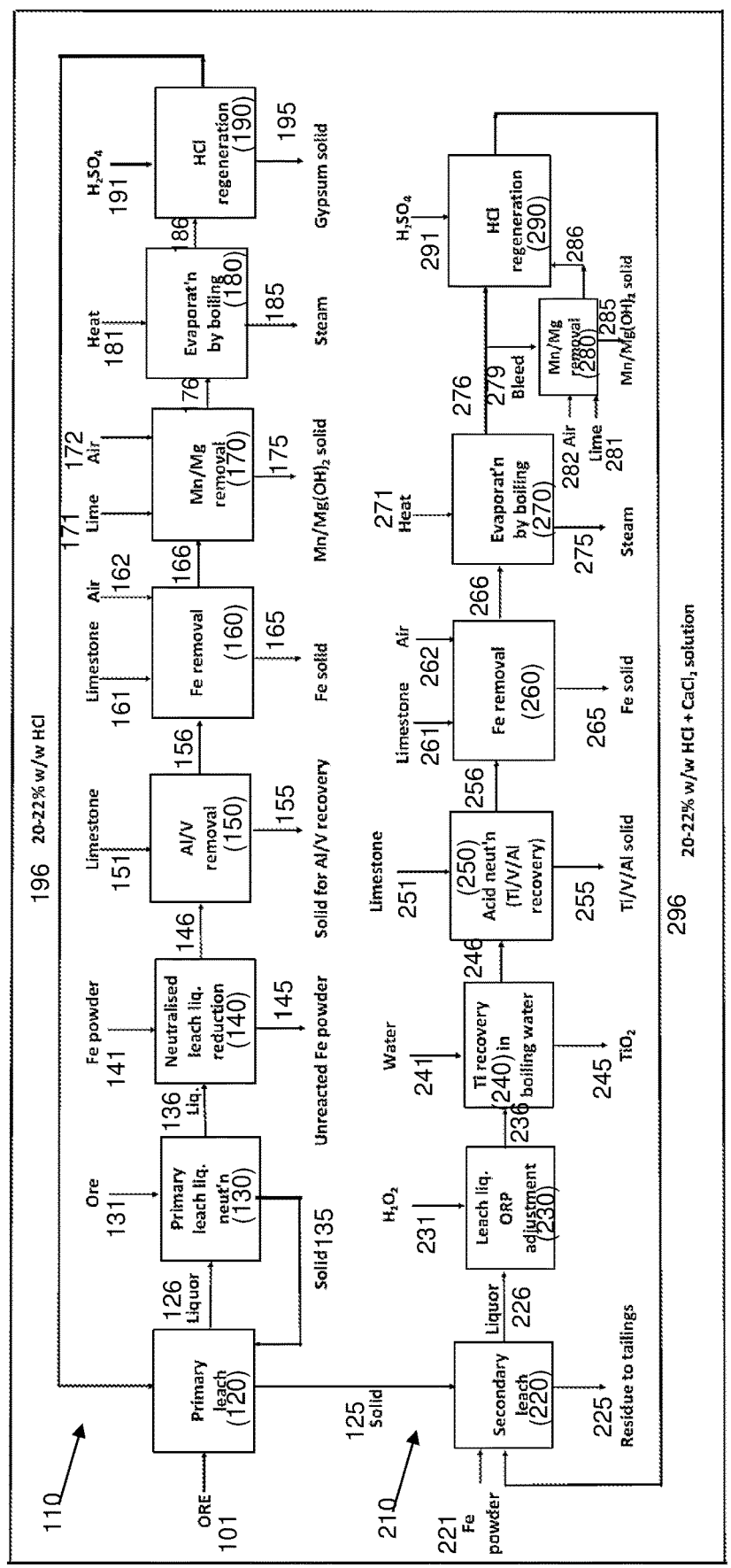
FIG. 2 is general flow diagram showing the process steps for another embodiment of the process according to the present invention which is a modified process flowsheet of the process shown in FIG. 1.
Figure 4:
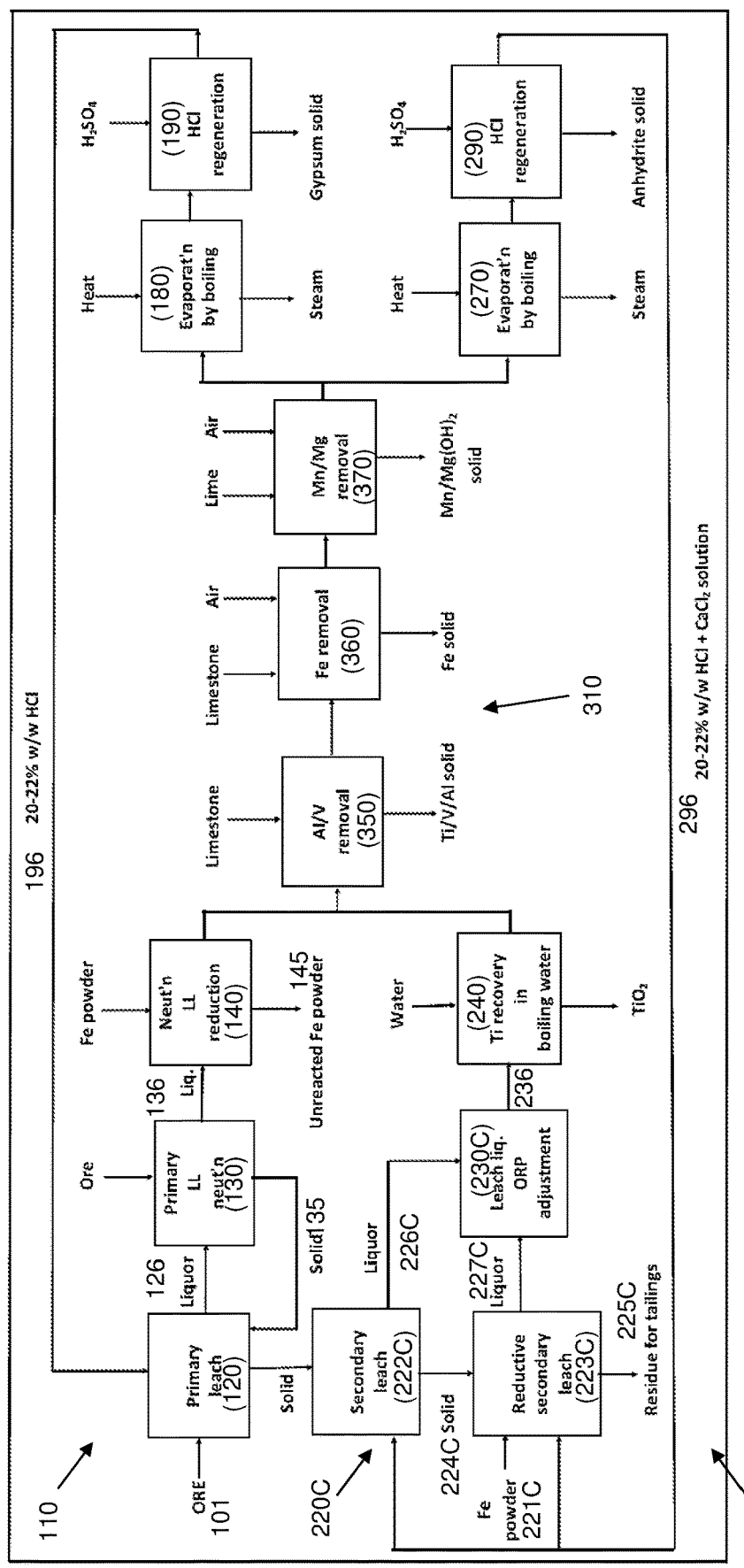
FIG. 4 is general flow diagram showing the process steps for another embodiment of the process according to the present invention which is a modified process flowsheet of the process shown in FIG. 3 including a two stage second leach step.

In other embodiments, for example as shown in FIG. 4 (described in more detail below), the secondary leach stage 220C is completed as a two stage reaction where first stage second leach (222C) comprises the dissolution of mainly ilmenite minerals without Fe powder addition 221C and second stage second leach 223C comprises the reaction of the first stage second leach solid with Fe powder to dissolve remaining unreacted ilmenite minerals and the other Ti bearing mineral phases. If required, an additional small amount of fresh second lixiviant solution (mixed chloride solution of 20 to 22% w/w HCl and calcium chloride ($CaCl_2$)) solution) can be added in the second stage second leach 223C to stabilise dissolved metals and additional iron coming from the added Fe powder 221C. A solid-liquid separation is conducted of the produced second leach slurry to separate the Ti rich second leach liquor 227C and second leach solids 225C. The second stage second leach slurry/solid 225C exits the process as tailing. The first stage second leach (222C) preferably includes a solid/liquid separation stage, to separate a first stage second leach slurry/solid 224C and a first stage second leach liquor 226C, with the first stage second leach slurry/solid 224C being fed into the second stage second leach 223C and the first stage second leach liquor 226C being fed into the subsequent oxidation stage 230C to be mixed with the second stage second leach liquor 227C, producing a mixed second leach liquor which is processed as the Ti rich second leach liquor 226 (as shown in FIG. 1) in the second leach process stream (as below).

ii) The Ti rich second leach liquor 226 is treated with dilute $H_2O_2$ 231 in oxidation stage 230 to oxidise any Ti(III) content of the liquor to Ti(IV) by controlling the oxidation reduction potential of the liquor within 100 to 200 mV to produce a oxidised Ti(IV) liquor 236.

iii) Titanium (as titanium oxide) is then recovered from the oxidised Ti(IV) liquor 236 by adding heated/boiling water 241 to the oxidised Ti(IV) liquor 236 to hydrolyse Ti(IV) and thereby precipitating that content as a titanium dioxide ($TiO_2$) solid. The reaction is preferably performed under an inert gas atmosphere such as a nitrogen blanket to prevent oxidation of ferrous iron to ferric iron in the liquor and therefore hinder the unwanted precipitation of ferric iron with $TiO_2$ in the washing stage of $TiO_2$. The resulting Ti(IV) hydrolysis will release HCl in the solution. In some embodiments, this additional HCl can partially be neutralised by adding limestone/lime slurry to maximise $TiO_2$ recovery (not illustrated in FIG. 1). A solid-liquid separation is then conducted of the produced $TiO_2$ slurry to separate a $TiO_2$ solid 245 and a ferrous iron bearing liquor 246.

iv) As shown in FIG. 2, the ferrous iron liquor 246 may be subjected to a V/Al removal stage 250 depending on the V and Al concentrations in the $TiO_2$ precipitated liquor in which vanadium and aluminium are precipitated under nitrogen blanket by raising pH of the ferrous iron liquor 246 to ~3 to 6 at 50 to 80° C. by adding limestone or lime as the neutralising agent 251. A solid-liquid separation is then conducted of the produced vanadium (V) and aluminium (Al) removed slurry to separate precipitated solid 255 and the V/Al removed liquor 256. Vanadium (V) and aluminium (Al) can be recovered from the V/Al precipitation solid by adopting the same procedure as explain for the first leach liquor.

Figure 3:
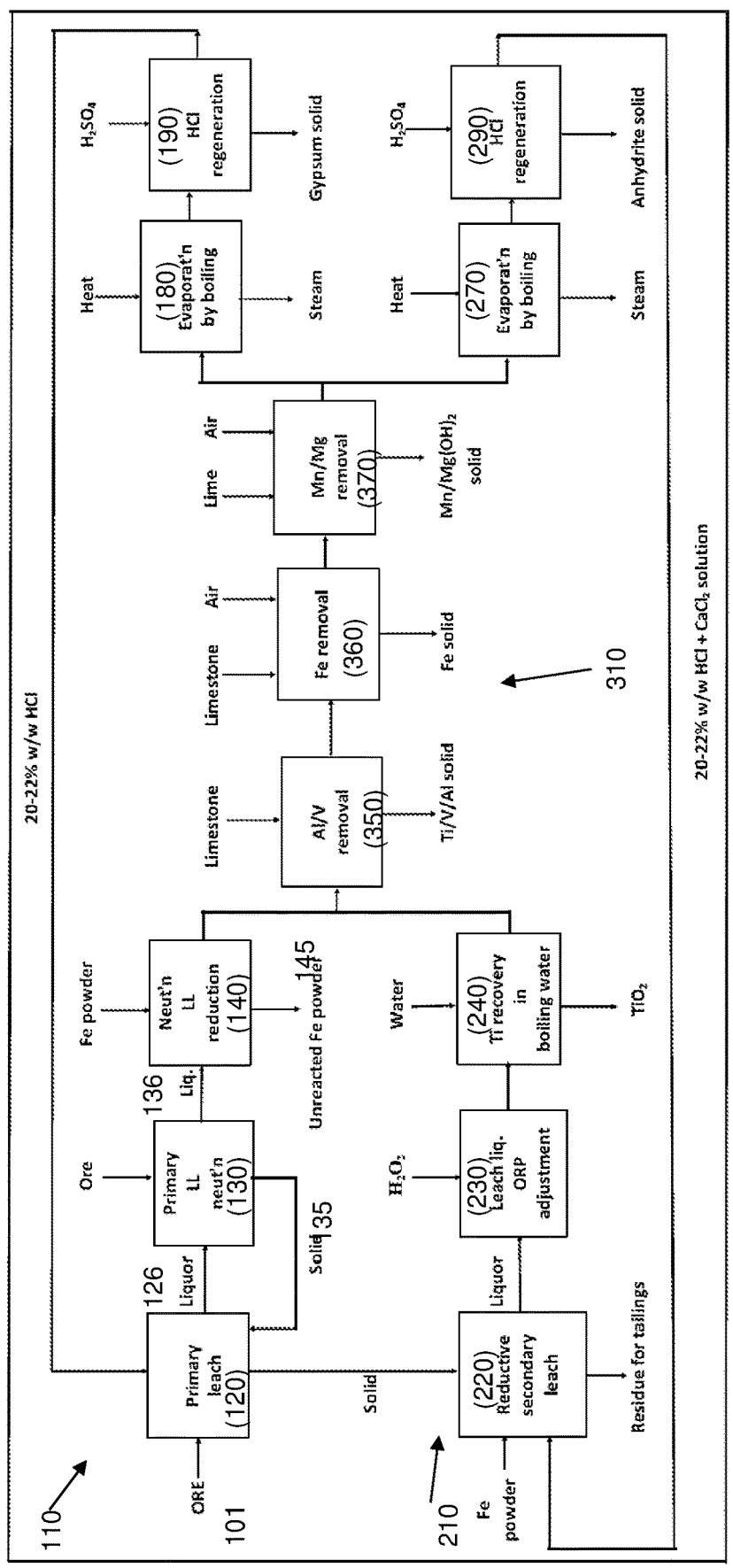
FIG. 3 is general flow diagram showing the process steps for another embodiment of the process according to the present invention which is a modified process flowsheet of the process shown in FIG. 2 including combined process steps.

If the V and Al concentrations in the $TiO_2$ precipitated liquor is higher, then the ferrous iron liquor 246 of this second leach processing stream 210 can be fed/combined with the V/Al precipitation stage 150 of the first leach processing stream 110 (as shown in FIGS. 3 and 4) to simplify/optimise process usage of these processing stages operation if required as the further downstream steps are identical prior to HCl regeneration stage (see below).

v) The ferrous iron liquor 246 is fed to an iron recovery stage 260 in which iron is precipitated from the liquor at a temperature of 70 to 90° C. through the addition of limestone or lime as the neutralising agent 261 in the presence of air 262 (an oxidant for the precipitation reaction) to change the solution pH to ~4 to 7. Again, the precipitated iron removal solid 265 mostly comprises magnetite, goethite, hematite and akageneite. However, magnetite is the most preferable precipitated from this stage. Conditions are preferably optimised to substantially precipitate magnetite. A solid-liquid separation is then conducted of the produced iron removed slurry to separate the precipitated Fe solid 265 and the Fe removed liquor 266 which is mainly the calcium chloride solution.

vi) The calcium chloride solution 266 is fed into an evaporation stage 270 to evaporate a water content to get a suitable calcium chloride concentration prior to the subsequent HCl regeneration stage 290. Evaporation is typically achieved by heating/boiling the calcium chloride solution 266 through the addition of heat 271. In this evaporation stage 270, water partially evaporated to produce concentrate calcium chloride solution 276 having a required calcium chloride concentration for second lixiviant generation.

vii) Where the liquor includes a magnesium and/or manganese content, the second leach process stream 210 can include a Mg and Mn removal stage 280. Here either a content is bled from the process line into a bleed line 279 (FIGS. 1 and 2), or a dedicated stage is used (FIGS. 3 and 4). In each case, the liquor is fed into a Mg and Mn removal stage 280 in which magnesium and/or manganese is precipitated from the liquor at a pH ~9 to 10 and at a temperature of 60 to 90° C. using lime as a neutralising agent 281 and air 282 as an oxidant typically for the oxidation of Mn(II) to Mn(IV). The precipitated Mg/Mn removal solid 285 will comprise $Mg(OH)_2$ and a mixture of Mn-oxide/hydroxide. A solid-liquid separation is then conducted of the produced Mg and Mn removed slurry to separate precipitated solid 285 and the Mg/Mn removed liquor 286 which will be mainly calcium chloride solution.

viii) The concentrated calcium chloride solution 276 is reacted with concentrated sulphuric acid (98% w/w) 291 in regeneration stage 290 at a required stoichiometric ratio of calcium chloride in the liquor to sulphuric acid to regenerate the second lixiviant (an equivalent 20 to 22% w/w hydrochloric acid in the liquor and leaving the remaining calcium chloride in the solution) and simultaneously precipitating gypsum, hemihydrate or anhydrite compounds or mixture of these compounds. The reaction can be performed in a temperature range of 30 to 90° C. The reaction can be performed at a temperature range of 30 to 90° C. under atmospheric conditions. The reaction between the concentrated calcium chloride solution 276 and concentrate sulphuric acid 291 is preferably performed in a temperature range of 80 to 85° C. aiming to precipitate anhydrite only. A solid-liquid separation is then conducted of the produced the mixed chloride regenerated slurry to separate the precipitated solid and the regenerated second lixiviant solution 296. The regenerated second lixiviant solution 296 is recycled back to the second leach stage 220.

It should be appreciated that the neutralising agents 151, 161, 251, 261 for: i) Al/V removal stage 150, 250; and ii) Fe removal steps 160, 260 in Stream-1 110 and Stream-2 210 of the process 100, can be limestone or lime (as discussed), and/or in other embodiments MgO. Amongst these neutralising agents, limestone is the preferred neutralising agent 151, 161, 251, 261 as it is a low-price reagent.

FIG. 1 exemplifies the use of limestone or lime as neutralising agent 151, 161, 251, 261. However, it should be appreciated that when MgO is added for neutralisation for these steps 150, 250, 160, 260, it will form $MgCl_2$ in the relevant liquor. Therefore, where MgO is used in the process 100, the process liquors will comprise a $MgCl_2$ bearing solution for Stream-1 100 and a mixed $CaCl_2$) and $MgCl_2$ bearing solution for Stream-2 210 (where $CaCl_2$) is used as the additional chloride in the second lixiviant, it can be a $MgCl_2$ bearing solution for Stream-2 210 where $MgCl_2$ is used as the additional chloride in the second lixiviant). Any Mg content will be removed using the described Mn/Mg removal steps 170, 280 in the process 100. However, in these steps MgO would need to be regenerated from the Mg-removal steps 170, 280 and the regenerated solid recycled back to the neutralisation steps 150, 250, 160, 260.

The following process steps are required after Fe-removal step when MgO is used a neutralising agent:

If Mn is present in the liquor obtained after Fe-removal step, then Mn-removal and Mg-removal steps 170, 280 will be performed separately using lime as the neutralising agent.
a) First a Mn-removal step will be performed using the Fe-removed liquor 166, 276 in the presence of an oxidant (for example air, oxygen, $H_2O_2$) at pH below 9 by adding lime to precipitate Mn as oxide/hydroxide or as a mixture. Solid-liquid separation will be performed to obtain a Mn-removed liquor and Mn-rich precipitate.
b) Mg removal can then be performed after Mn-removal using Mn-removed liquor at pH 9 to 10 by adding lime to precipitate Mg as $Mg(OH)_2$ and the liquor will mainly have $CaCl_2$) (for HCl regeneration). $Mg(OH)_2$ obtained after solid-liquid separation will be subjected to calcination at ~300 to 400° C. to regenerate MgO for recycling.
c) In the embodiments, where Mn is not present in the liquor obtained after Fe-removal step, only a single Mg-removal step will be required as explained above.

Where $MgCl_2$ is used as the additional chloride in the second lixiviant, Ti leaching in the second leach stage 220 will be performed using a second lixiviant comprising a mixture of HCl and $MgCl_2$ solution. Whilst not illustrated, it should be appreciated that the liquor after $TiO_2$ precipitation can go for Fe-removal using MgO to produce magnetite (instead of high temperature $FeCl_3/FeCl_2$ hydrolysis to produce hematite) and the required $MgCl_2$ solution. As indicated above, a required amount of $Mg(OH)_2$ can be precipitated using lime from the $MgCl_2$ solution to obtain a $CaCl_2$)+$MgCl_2$ solution where $CaCl_2$) concentration should be equivalent or higher for the 20 to 22% w/w HCl regeneration using 98% $H_2SO_4$. In this case, MgO and HCl+$MgCl_2$ solution are also regenerated.

As shown in FIGS. 2 and 3, common stages for both the first leach process stream 110 and second leach process stream 210 such as V/Al removal 350, Fe removal 360 and Mg/Mn removal 370 can be combined to perform into a common process stream 310 to reduce the capital investment and also the operation cost. Here the liquors from the first leach process stream 110 and second leach process stream 210 are combined prior to V/Al removal 350 and are separated into separate process streams prior to evaporation stages 180 and 270. However, it should be appreciated that evaporation stage 180 after Mg/Mn removal may not be required to generate 20 to 22% w/w HCl for first leach process stream 110 as the $CaCl_2$) concentration may be high enough due to the mixing of the process liquors prior to V/Al precipitation step 250. Therefore, only a single evaporation stage may be required in some embodiments.

As indicated above, in some embodiments the second leach stage 220 can be modified to reduce the Fe powder addition 221 and increase the overall Ti extraction by performing the second leaching in two stages. As illustrated in FIG. 4, the second stage leach 220C can comprise two leach stages: i) second leach (SL) 222C; and ii) reductive second leach (RSL) 223C. The SL 222C is performed without reductant and RSL 223C is performed with Fe powder addition. The two-stage second leaching step 220C, may allow for the elimination/minimisation of $H_2O_2$ requirement for Ti(III) oxidation, as the SL leach liquor 226C from SL 222C containing Fe(III) will oxidise the Ti(III) present in RSL leach liquor 227C. However, the ratio of SL leach liquor 226C to RSL leach liquor 227C is required to be adjusted appropriately for only Ti(III) oxidation to occur in RSL leach liquor 227C, otherwise, the Ti(IV) present in the SL leach liquor 226C may get reduced if excess RSL leach liquor 227C is added.

Each of the described stages can be performed in suitable process vessels suitable for leaching, precipitation, boiling, mixing and the like process steps. As previously noted, no specialised material of construction is required for the reactor design criteria in this process. Standard fibre glass and/or high-density polyethylene (HDPE) and/or polypropylene (PP) tanks can be used to meet the reactor/equipment requirement. Compared to prior art pyro-hydrolysis or high temperature hydrolysis technique, the lixiviant regeneration in the present invention is a simpler process where energy requirement is low and the material of construction is not critical (i.e. not requiring high temperature and corrosion resistant materials).

It should be appreciated that the solid/liquid separation for all the stages can be operated using any suitable method and process equipment. Techniques for such separation are known e.g. using a pressure or vacuum filter, counter-current decantation, thickener or centrifuge. In particular embodiments, solid/liquid separation can be operated using a thickener operation. Washing stages will only be applicable for the solids that are going out of the circuit such as: i) final leach solid from second leach; ii) $TiO_2$ precipitate; iii) V/Al precipitate; iv) Fe precipitate; v) Mg/Mn removal solid; and vi) gypsum solids. It would not be essential to wash intermediate solid which is moved from one stage to another inside the process as the respective stages of the process should be able to accommodate any entrained liquor coming with the intermediate solids.

The product from this process is a high-grade titanium dioxide product, along with one or more additional value metals selected from vanadium, aluminium, iron, magnesium or manganese.

EXAMPLES

Aspects of the two-stream process of the present invention is illustrated by the following examples:

Example 1—Titanium Dioxide Recovery from Ilmenite Bearing Ti Ore Concentrate 1. Experimental Process An experiment process flowsheet as shown in FIG. 1 was developed to test a titanium and other value metal recovery process that can operate at low HCl concentration (~20 to 22% w/w HCl) for a Ti ore (see composition below) of West Australian origin that could also regenerate HCl at low temperature (<100° C.) under atmospheric conditions. As described above, there are two main process streams for the proposed flowsheet, where Stream-1 was studied in ~20 to 22% w/w HCl system and Stream-2 was studied in mixed HCl+$CaCl_2$) system having ~20 to 22% w/w HCl in mixed HCl and $CaCl_2$) with a $CaCl_2$) concentration of ~300 g/L. The different stages covered in the investigation for both the streams were:

Process Stream-1: Primary leaching, leach liquor neutralisation, reduction of the neutralised liquor, V/Al removal, Fe removal, Mg/Mn removal, evaporation of the Mg/Mn removed liquor (to concentrate $CaCl_2$) in the liquor for HCl regeneration) and hydrochloric acid regeneration.

Process Stream-2: Secondary leaching of the Stream-1 primary leach residue, $TiO_2$ recovery, Fe removal, Mg/Mn removal, evaporation of the Mg/Mn removed liquor (to concentrate $CaCl_2$) in the liquor) and hydrochloric acid regeneration.

2. Method and Materials
2.1 Materials

A ~10 kg of Ti ore concentrate of West Australian origin and ~1 kg Fe powder (Fe grit 120) were used in this investigation. The concentrate was thoroughly homogenised, and a sub-sample was collected for analysis. The various chemicals such as HCl, $H_2SO_4$, $FeCl_3$, $CaCO_3$ and $Ca(OH)_2$ used in this investigation were of laboratory reagent grade.

2.2 Experimental Procedure
2.2.1 Pre-Leach Test Work with Dilute HCl, $H_2SO_4$ and $FeCl_3$ The pre-leach test work was performed in a 0.5 L glass reactor using 5% w/w HCl, 5% w/w $H_2SO_4$ and ~150 g/L of $FeCl_3$ solutions at ~65° C. with ~20% w/w pulp density for 2 h. The concentrate and the prepared solution of HCl, $H_2SO_4$, $FeCl_3$ were taken to the reactor and heated in a water-bath at 65° C. for 2 h. The final slurry was filtered, and the liquor was analysed for desired elements by ICP-OES.
2.2.2 Process Stream-1

2.2.2.1 Primary Leaching

Primary leach tests were performed in 2 L and 5 L glass reactors using 17% to 21% w/w HCl at 95 to 97° C. with 20% w/w pulp density for 1 to 4 h duration. The reactor was fitted with a glass lid connected to a condenser. For the initial two tests, a required amount of HCl solution was taken in a 2 L reactor and concentrate was added to the reactor at 50 to 60° C. Once the reaction temperature was attained (~95° C.), a sample was collected, and the reaction was continued for 4 hours sampling at every hour. The samples were filtered, and the solids were top washed initially with ~15% HCl solution followed by repulped/washed with deionised (DI) water. At the end of the reaction the reactor slurry was filtered; the solid was washed thoroughly and dried at 60° C. in an oven.

Three bulk leach tests were performed in a 5 L reactor for 2 h duration. A required amount of concentrate material and HCl solution were taken in the reactor and heated to the test temperature. At the end of the test, a sample was collected and filtered in a pressure filter. The solid was washed similarly as described for the initial tests. The bulk slurry was filtered in a pressure filter and the liquor was stored in an air-tight bottle. The wet cake was repulped with ~2 times cake volume of ~15% HCl solution followed by a second repulp of the first wash cake with ~2 times DI water (deionised water). A representative wet cake sample was collected from the second washed cake for moisture determination and chemical analysis. The washed wet cake was stored in an airtight bag for reductive leach test work. The solid, final liquor and wash liquors were analysed for Fe, V, Ti, Al, Mn, Ca, Mg and Si. The free acid was analysed in the collected samples and in final liquors. The final liquors and the second washed cakes from the three bulk leach tests were separately homogenised and stored in the air-tight containers. The homogenised liquor was used for further processing and the cake was used for Stream-2 leach test work.

A primary leach test was also performed in a 2 L reactor using the regenerated HCl from the Stream-1 of the process following the same conditions and procedure of the bulk leach test. The test was conducted for 2 h without collecting any sample.
2.2.2.2 Neutralisation of the Primary Leach Liquor The free acid analysis reported very high acid concertation (~140 g/L) in the homogenised primary leach liquor. The majority of the free acid in the leach liquor was neutralised adding Ti concentrate material in a 5 L reactor. The final slurry was filtered, and the liquor was stored for further processing.

The Ti concentrate neutralised liquor was further treated with limestone to neutralise the remaining free acid to obtain a free acid in the liquor <5 g/L.
2.2.2.3 Iron Reduction of the Neutralised Leach Liquor The reduction tests were performed in 0.5 L and 5 L glass reactors (fitted with pH and ORP probes) at 70° C. using concentrate/limestone neutralised leach liquor. A calculated amount of Fe grit 120 was added slowly to the reactor containing concentrate/limestone neutralised liquor for Fe(III) reduction. Tests were performed under the nitrogen blanket during Fe grit addition. Online pH and ORP (oxidation reduction potential) were recorded continuously until the ORP of the liquor was found to be negative and relatively stable. The slurry was filtered in a filter press and the solid was repulped/washed with water and dried in an oven. The final liquor was stored in an air-tight bottle under nitrogen blanket for further test work. Both the solid and liquor were submitted for analysis.

2.2.2.4 Aluminium and Vanadium Removal from the Reduced Liquor

The Al/V removal tests were performed in 0.5 L and 5 L glass reactors (fitted with pH and ORP probes) at 70° C. by raising pH of the reduced liquor with limestone. The limestone slurry was added slowly to the reactor at 70° C. measuring the on-line pH and ORP. The tests were performed under nitrogen blanket to prevent ferrous oxidation. At the end of the test, the slurry was filtered in a filter press and the solid was repulped/washed with water and dried in an oven. The final liquor was stored in an air-tight bottle under a nitrogen blanket for further test work. Both solid and liquor were submitted for analysis.

2.2.2.5 Iron Removal from Al/V Removed Liquor

Iron removal tests were carried out in a 2 L glass reactor fitted with pH and ORP probes, thermometer, air purging tube and condenser. The test solution was heated to a set temperature (80° C.) under nitrogen blanket to prevent Fe(II) oxidation. Initially lime or limestone slurry was added to raise the pH of the reactor for a target precipitation pH of ~4.2 to 5.0 followed by air purging started at a flow rate of ~2.0 to 5.0 L/min. The pH of the reactor was maintained by continuously adding the limestone slurry. A sample was collected prior commencing the air addition, followed by samples were collected at regular interval. The collected samples were filtered immediately, the wet cake was washed thoroughly with DI water and dried in an oven at ~60° C. The iron concentration in the filtrate was determined by analysing the ferrous concentration using standard dichromate method. Based on the ferrous analysis, the retention time of the iron removal test was determined. Typically, the tests were performed for a period of 3.5-5.0 h.

At the end of the test, the slurry was filtered using a pressure filter. The cake was washed with DI water by repulping, and the washed solid was dried in the oven. The solids and liquors were submitted for chemical analysis.

2.2.2.6 Magnesium and Manganese Removal from the Fe Removed Liquor

Magnesium and manganese removal were performed at 60° C. in a 5 L reactor fitted with pH and ORP probes using the Fe removed liquor. Dry lime was added slowly to the reactor at 60° C. to raise the pH ~9 of the liquor followed by a calculated amount of 7.5% w/w $H_2O_2$ was added for Mn oxidation. The final slurry was filtered and the solid was washed by repulping and then dried at 60° C. The solid and liquor were submitted for analysis.

2.2.2.7 Hydrochloric Acid Regeneration from Mg/Mn Removed Liquor

Prior to the HCl regeneration test work, the Mg/Mn removed liquor was evaporated in a 5 L beaker using a hot plate to achieve a required Ca concentration in the liquor so that >20% w/w HCl can be produced during the HCl regeneration reaction.

The HCl regeneration test work was performed in 0.5 L and 1 L reactors at 80 to 85° C. by adding a calculated amount of 98% w/w $H_2SO_4$ using evaporated liquor. Initially the solution was heated to ~60 to 70° C. and $H_2SO_4$ addition started. The acid was added slowly/dropwise, and the temperature rise of the reactor slurry was recorded. Once the reactor slurry attained ~80 to 85° C., the acid addition was controlled to maintain the reactor temperature. At the end of the reaction, the final slurry was filtered in a filter press and the cake was repulped/washed twice with approximately one-time cake volume of the gypsum saturated water. The solid was dried at ~45° C. The final liquor was stored for recycle leach of the feed concentrate material. The acid concentration in the final liquor was determined using the standard titrimetric analysis. The solid, final liquor and wash liquors were submitted for elemental analysis.

2.2.3 Process Stream-2

2.2.3.1 Secondary Leaching of the Primary Leach Residue

The secondary leach tests were performed in 2 L and 5 L glass reactors using primary leach residue in HCl—$CaCl_2$) mix solution at 75 to 80° C. ° C. for 4 to 6 h in the absence and presence of Fe Grit 120 reductant. A required amount of primary leach wet cake and HCl—$CaCl_2$) solution (having desired concentration of HCl and $CaCl_2$)) were taken in a reactor to obtain pulp density of ~4.9 to 8.8% w/v. The reactor was fitted with a condenser, thermometer and ORP probe and placed in a hot water bath. The reaction was continued for 1 to 3 h at test temperature, after which ~1.3 to 2 g Fe grit 120 was manually added (where appropriate) at a regular interval of ~5 to 10 minutes till the end of the reaction. Online ORP of the reaction was recorded during leaching with Fe grit addition. Samples were collected at an interval of 1 h and filtered immediately in a filter press. The solid was initially repulped/washed with 15% w/w HCl followed by repulped/washed with DI water. The final slurry was processed similarly as the collected sample. The liquor (filtrate) was diluted immediately for analysis as crystallisation was found to occur in the leach liquor upon storing at ambient temperature.

Two bulk secondary leach tests were performed without sampling in a 5 L reactor with Fe grit addition to generate leach liquor for further treatment. At the end of the reaction, the slurry was filtered in a filter press and the liquor was stored in an air-tight bottle at ~60° C. to prevent the crystallisation of iron. The wet cake was repulped/washed initially with ~2 times cake volume of 15% w/w HCl followed by with DI water to generate the washing data. The second washed cake was dried at 60° C. Diluted final liquor, wash liquors and solids were submitted for analysis. The leach liquors from both the tests were used for $TiO_2$ precipitation test work.

2.2.3.2 Precipitation of $TiO_2$

Titanium dioxide precipitation tests were performed in 0.5 L and 5 L reactors at 90 to 95° C. by hydrolysing the Ti-ion from the secondary leaching solution in hot water. Initially the secondary leach solution was oxidised at room temperature with dilute $H_2O_2$ to get an ORP of ~150 to 200 mV. A required amount of DI water was heated to the test temperature in a reactor fitted with a thermometer and condenser. The oxidised solution was added slowly until the water to liquor ratio became 1:1, followed by the slurry being agitated for possible agglomeration of $TiO_2$ particles. The test was performed under nitrogen blanket to minimise the Fe(II) oxidation. At the end of the test, the slurry was filtered in a pressure filter and the liquor was stored for further processing. The solid was washed initially with 10 to 15% HCl followed by with DI water. The solid was dried at 60° C. overnight. The solid and liquor samples were submitted for analysis. $TiO_2$ precipitation test liquors were combined to generate a bulk liquor for further processing.

2.2.3.3 Acid Neutralisation and Iron Removal from $TiO_2$ Precipitated Liquor The $TiO_2$ removed liquor reported a high free acid analysis (~70 g/L) which was neutralised by adding limestone. The acid neutralised liquor was used for Fe removal. The Fe removal tests were performed in a 5 L reactor using the neutralised liquor following the same procedure as explain in Section 2.2.2.5. The iron removal test liquors were homogenised for further downstream processing.

2.2.3.4 Magnesium/Manganese Removal from Fe Removed Liquor

Initially, the Fe removed liquor was partially evaporated (~34% by mass) by heating the solution on a hot plate. The partially evaporated liquor was used for Mg/Mn removal following the same procedure as described in Section 2.2.2.6.

2.2.3.5 Hydrochloric Acid Regeneration from Mg/Mn Removed Liquor

The Mg/Mn removed final liquor was further evaporated to achieve a required Ca concentration in the liquor so that ~20% w/w HCl can be produced during the HCl regeneration reaction. The HCl tests were performed in a 2 L glass reactor using the same procedure as outlined in Section 2.2.2.7.

3. Results

3.1 Chemical and Mineralogical Analyses

The analysis of the Ti concentrate of Western Australian origin is given in Table 1. The elemental analysis was ~34% Fe, 0.34% V, 23.6% Ti, 2.2% Al, 0.8% Mg, 3.7% Si and <0.2% analysis of Ca, Cr, Cd, Cu, Na, K and Zn. The mineralogy of the concentrate reported ilmenite, hematite, goethite and quartz phases along with a reasonable amount of clinochlore and kaolinite minerals.

TABLE 1

Analysis of the Ti concentrate of West Australian origin.
Ti Concentrate analysis (%)

| Fe | V | Ti | Al | Mn | Ca | Mg |
|---|---|---|---|---|---|---|
| 33.84 | 0.34 | 23.59 | 2.19 | 0.19 | 0.21 | 0.75 |
| Si | Cd | Cr | Cu | K | Na | Zn |
| 3.73 | <0.01 | 0.005 | 0.020 | 0.109 | 0.14 | 0.036 |

3.2 Pre-Leach Test Results

The purpose of the pre-leach was to examine if it was possible to remove the undesired impurities prior to the primary leach test. The undesired impurities are mainly the monovalent cations such as Na and K, because these are the unrecoverable chloride consuming elements. Three pre-leach tests were done using 5% w/w HCl, 5% w/w $H_2SO_4$ and ~150 g/L of $FeCl_3$ solutions at 65° C. with ~20% w/w pulp density for 2 h. The leach liquor analysis and percentage of dissolved metals are given in Table 2 and Table 3, respectively.

TABLE 2

Leach liquor analysis of the pre-leach tests using
5% w/w HCl, 5% w/w $H_2SO_4$ and 150 g/L $FeCl_3$.

| Liquor | Liquor pH | Fe(t) | V | Ti | Al | Mn | Ca | Mg | Na | K | Cu | Zn |
|---|---|---|---|---|---|---|---|---|---|---|---|---|
| HCl pre-leach final | 0.23 | 3940 | 40 | 27 | 827 | 40 | 42 | 585 | 25 | 13 | 8 | 12 |
| $H_2SO_4$ pre-leach final | 0.63 | 2383 | 23 | 13 | 819 | 35 | 42 | 621 | 24 | 10 | 6 | 19 |
| $FeCl_3$ pre-leach feed | 0.69 | 45551 | <1 | <1 | 14 | 87 | 2 | <1 | <1 | <1 | 9 | 5 |
| $FeCl_3$ pre-leach final | 0.70 | 45986 | <1 | <1 | 76 | 121 | 39 | 48 | 24 | 7 | 12 | 8 |

TABLE 3

Dissolution of metals for the pre-leach tests using HCl, $H_2SO_4$ and $FeCl_3$ solutions.

| Test | Fe(t) | V | Ti | Al | Mn | Ca | Mg | Na | K | Cu | Zn |
|---|---|---|---|---|---|---|---|---|---|---|---|
| HCl pre-leach | 4.5 | 4.6 | — | 14.6 | 8.1 | 7.7 | 30.2 | 7.0 | 4.8 | 15.1 | 13.1 |
| $H_2SO_4$ pre-leach | 2.7 | 2.6 | — | 14.4 | 7.1 | 7.6 | 31.8 | 6.5 | 3.4 | 11.4 | 12.6 |
| $FeCl_3$ pre-leach | 3.8 | 0.1 | — | 1.2 | 8.9 | 7.8 | 2.8 | 7.2 | 2.6 | 7.3 | 4.1 |

The liquor analysis data indicated the dissolution of some Fe, Al, Mn, Ca, Mg, Na, K, Cu, Zn in these tests where Al and Mg dissolutions for $FeCl_3$ leach were very low compared to $H_2SO_4$/HCl leach. Around 23 to 40 mg/L V dissolution reported for HCl and $H_2SO_4$ leaching which was undesirable for the pre-leach tests. However, no V dissolution took place in the $FeCl_3$ system. Due to low dissolution of Na and K, the pre-leach tests were not found to be essential for the Ti concentrate to be used for the flowsheet development study. The Na and K analyses in the concentrate were also very low (~0.1%), therefore, no other pre-leach test was performed, and the concentrate was directly used for the primary leach test-work.

3.3 Process Stream-1:

3.3.1 Primary Leaching

Figure 5:
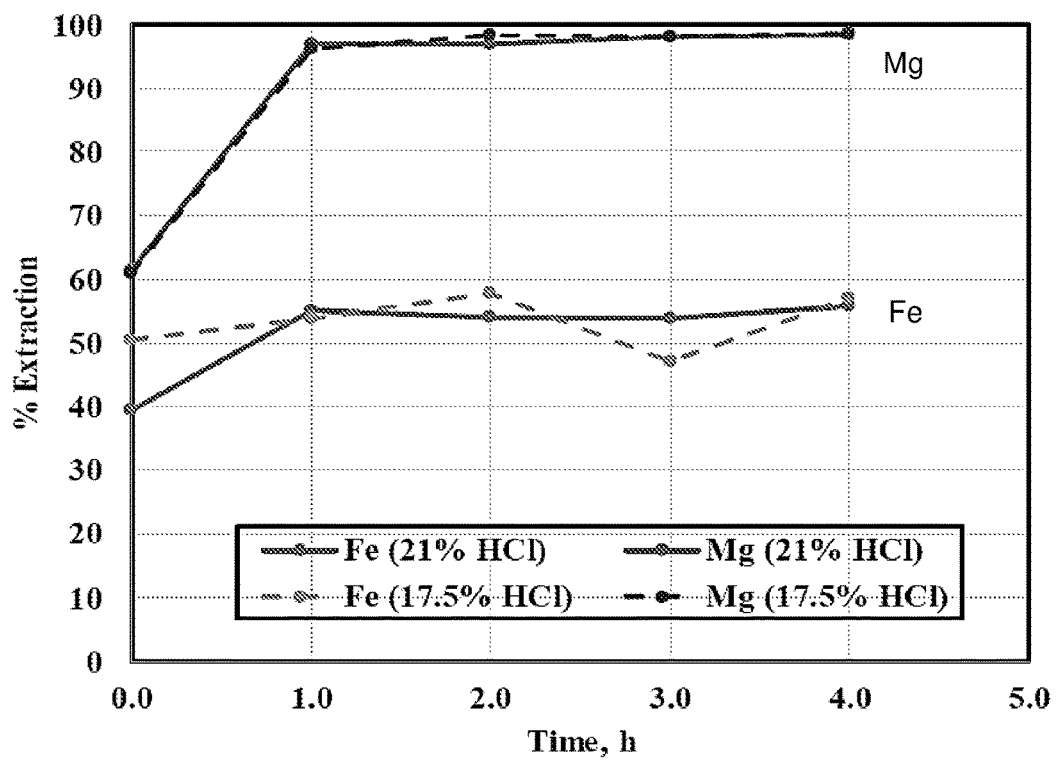
FIG. 5 provides a plot illustrating the extraction of Fe and Mg for 21% w/w and 17.5% w/w HCl primary leaching tests.
Figure 6:
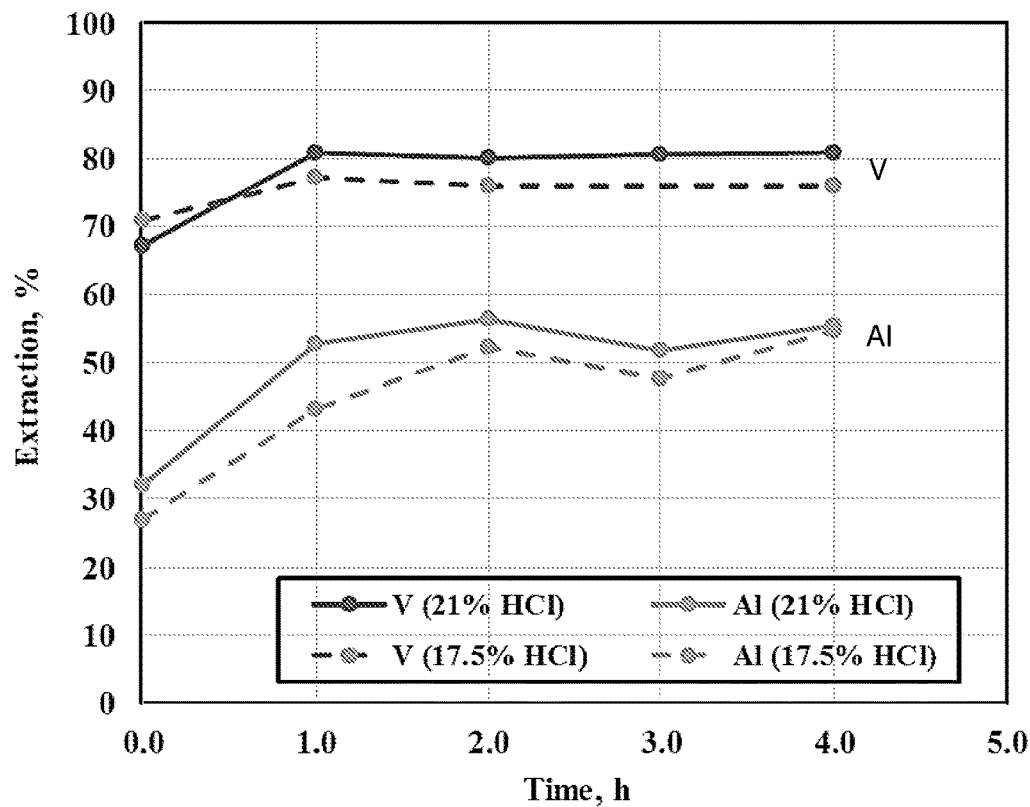
FIG. 6 provides a plot illustrating the extraction of V and Al for 21% w/w and 17.5% w/w HCl primary leaching tests.
Figure 7:
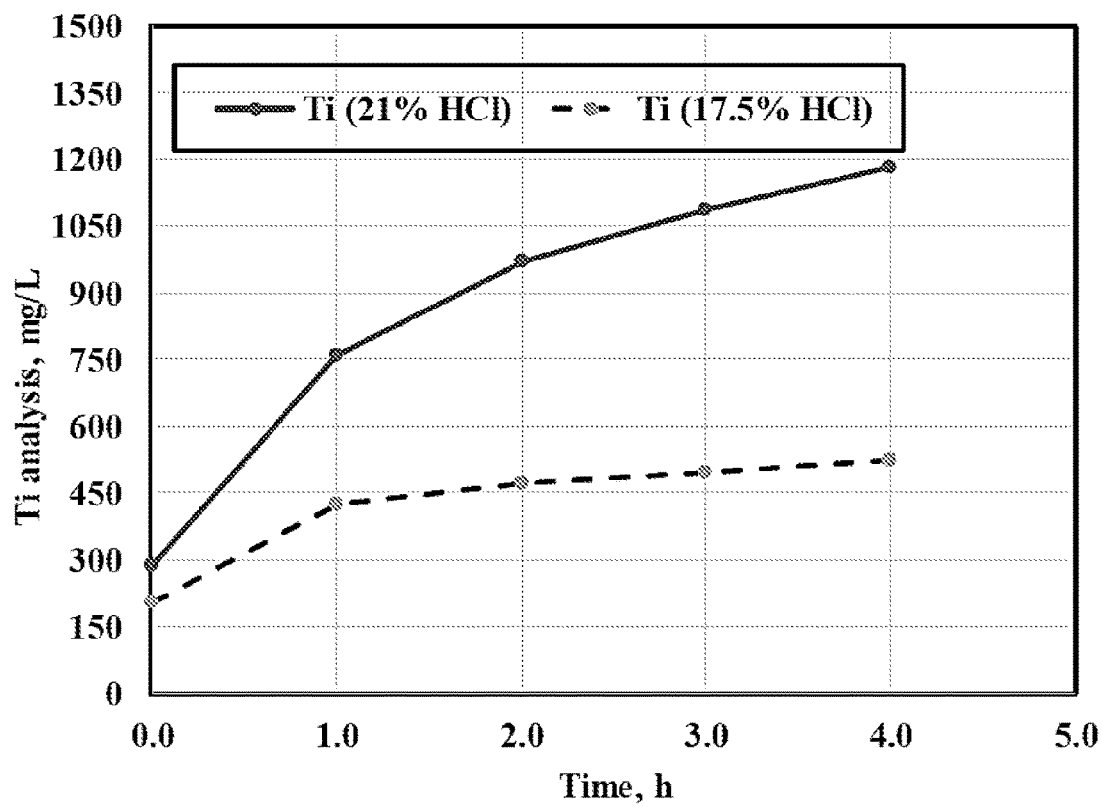
FIG. 7 provides a plot illustrating the concentration of Ti during primary leaching with 21% w/w and 17.5% w/w HCl.

The purpose of this primary leaching was to dissolve as much as possible of the impurities and V, leaving the ilmenite intact in the leach residue for secondary leaching. Initially two primary leach tests were performed at ~97° C. with 20% w/w pulp density for 4 h using ~21% w/w and ~17.5% w/w HCl concentration. Leach extraction data is shown in FIG. 5 for Fe and Mg and in FIG. 6 for V and Al. The Fe and Mg extractions were found to be similar in both the 17.5% and 21% w/w HCl concentration. The V and Al extraction was slightly higher at 21% w/w HCl compared to 17.5% w/w HCl. FIG. 5 and FIG. 6 show most of the Fe, Mg, V and Al extractions within 1 to 2 h of leaching; this indicates that 2 h leach time should be sufficient for the primary leaching under the conditions used. Titanium dissolution was found to increase gradually during leaching at both 17.5% and 21% w/w HCl (FIG. 7). The rate of increase was relatively higher at 21% w/w HCl compared to 17.5% w/w HCl. At 2 h of leaching, ~0.5 g/L and ~1.0 g/L Ti dissolution took place for 17.5% and 21% w/w HCl concentration, respectively. FIG. 7 clarifies that there will be some Ti dissolution (at least 0.5 g/L Ti) during primary leaching within 17.5 to 21% w/w HCl concentration and it will be difficult to minimise the Ti concentration below 0.5 g/L unless the acid concentration is reduced further. However, the reduced acid concentration will also reduce the V extraction. Therefore, considering the higher V extraction in the primary leaching, 21% w/w HCl concentration was chosen for further primary leach test work to generate the bulk leach liquors.

Three bulk primary leach tests (PL-3, PL-4 & PL-5) were performed at 21% w/w HCl for 2 h duration keeping the other conditions constant. The leach test results were found to be reproducible. Leach conditions of 21% w/w HCl, 97° C., 20% w/w pulp density and 1 to 2 h duration resulted in the dissolution of 48% Fe, 69% V, ~51% Al, 98% Mg, ~16% Mn, 1.8% Ti and 0.4% Si. The mineralogy of the leach solid reported ilmenite, quartz and clinochlore phases along with minor appearance of rutile phase. The leach liquor analysis was 41.5 g/L Fe, 0.64 g/L V, 0.9 g/L Ti, 3 g/L Al, 2.1 g/L Mg and <0.1 g/L of Mn, Ca and Si along with a free acid concentration of 140 g/L. The leach cake analysis reported 24 to 25% Fe, 27% Ti, ~1.5% Al, 4.5% Si, 0.15% V, 0.23% Mn and 0.02% Mg in the solid.

The leach liquor was treated in Steam-1 for downstream processing and the leach cake was used for secondary leaching in the Process Stream-2.

3.3.2 Primary Leach Liquor Neutralisation

The high free acid of primary leach liquor was neutralised with Ti concentrate and a final free acid concentration of ~41 g/L was achieved. The metals concentration in the neutralised liquor increased giving an analysis of ~73 g/L Fe, 1.26 g/L V, 0.4 g/L Ti, 6 g/L Al, 4.1 g/L Mg and <0.2 g/L of Ca, Mg and Si in the liquor.

The Ti concentrate neutralised liquor was further neutralised with limestone to reduce the free acidity to <5 g/L prior Fe(III) reduction stage.

3.3.3 Iron(III) Reduction of the Neutralised Leach Liquor

Figure 8:
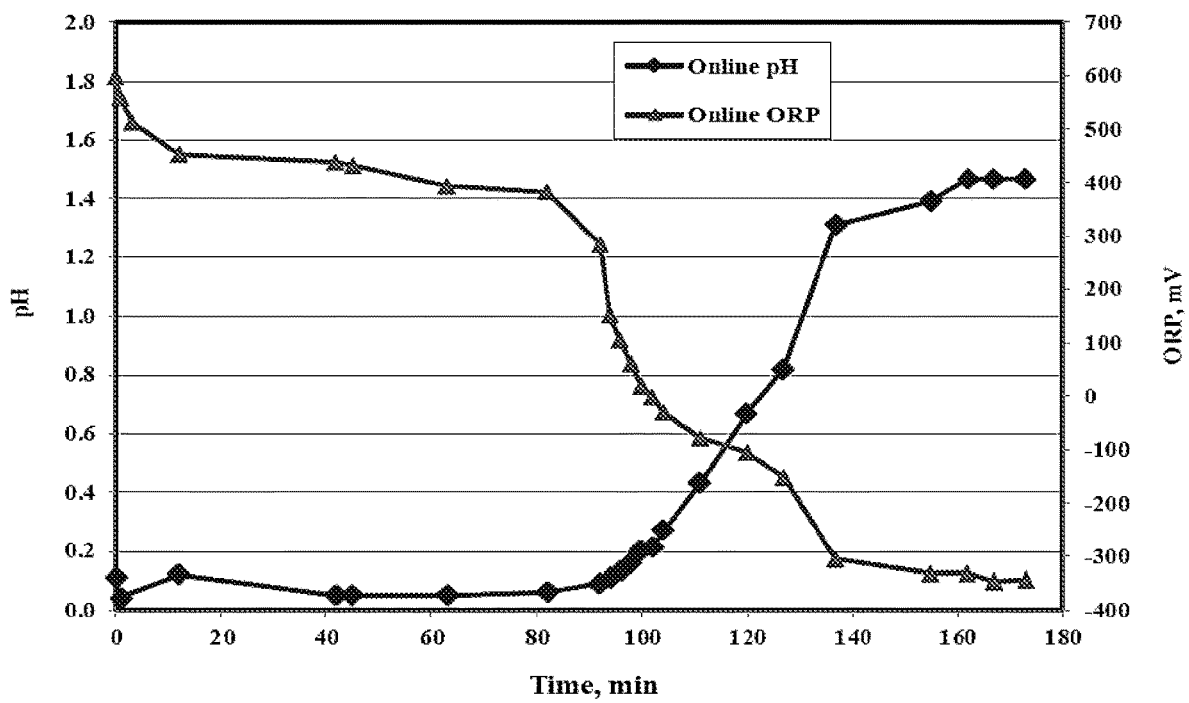
FIG. 8 provides a plot illustrating the profile of online pH and ORP vs time for a Fe(III) reduction test at 70° C. with 1.17 times stoichiometric addition of Fe grit.

The neutralised liquor was treated for the reduction of Fe(III) to Fe(II) with Fe powder (Fe grit 120) addition. The reduction tests were performed at 70° C. by adding higher than the stoichiometric requirement of Fe powder (Fe grit 120) under a nitrogen blanket to prevent the aerial oxidation of Fe(II). For a typical test with 1.17 times stoichiometric Fe grit addition, the pH and ORP profiles are given in FIG. 8 which shows an increase of pH (to 1.47) and decrease of ORP (to ~345 mV) with time. The pH and ORP of the reduced final liquor were ~1.9 and ~400 mV respectively, at ambient temperature. The oxidation-reduction potential (ORP) of the liquor/slurry decreased with time to a negative ORP and simultaneously the pH increased and remained below 2. There was a loss of ~5% V in the solid due to pH increase. However, this V loss is recoverable by dissolving the precipitate in HCl solution. The final Fe concentration as Fe(II) in the reduced liquor was ~110 g/L.

The reduced liquor was treated for V and Al removal at 70° C. under nitrogen blanket to precipitate both V and Al together by increasing the pH with limestone addition.

3.3.4 Vanadium and Aluminium Removal from the Reduced Liquor

V and Al removal from the reduced liquor containing ~111 g/L Fe, 1.19 g/L V and 6.1 g/L Al, was performed at 70° C. by raising the pH of the liquor to ~4.0 under nitrogen blanket with limestone and/or lime addition to precipitate V/Al as hydroxides.

Initially, two V/Al precipitation tests (V/Al PN-1 & V/Al PN-2) were performed by adding limestone and lime without/with $H_2O_2$ addition to understand the precipitation out/with $H_2O_2$ addition to understand the precipitation behaviour of V and Al. The $H_2O_2$ was added to increase the ORP of the reduced liquor to ~200 mV as the initial ORP of the reduced liquor was around ~300 mV. The partial oxidation with $H_2O_2$ was performed prior to limestone addition. In the initial two tests, the target pH was set to ~4.5. However, only limestone addition could not achieve the target pH possibly due to partial oxidation/precipitation of Fe(II). Therefore, an attempt was made to increase the pH by adding a small amount of lime slurry after the calculated amount of limestone addition. However, the pH of the reaction slurry remained ~4 or less even after lime addition. The analysis of the sample collected after the calculated amount of limestone addition gave >96% V and Al precipitation. This indicated that limestone addition was effective for V/Al precipitation and lime addition was not required.

Based on the initial two tests, a third test (V/Al PN-3) was performed by adding only limestone without any $H_2O_2$ where more than 99% V and Al precipitation took place giving a final liquor V and Al analyses of <10 mg/L and 50 mg/L, respectively, from a feed liquor having 1.19 g/L V and 6.1 g/L Al along with ~111 g/L Fe, 0.45 g/L Mn, 18 g/L Ca and 4 g/L Mg. A typical V/Al precipitation test solid analysis reported 2.6% V, 15.7% Al, 0.6% Fe, 0.01% Ti, 6.9% Ca, <0.001% Mn/Mg and 0.3% Si.

3.3.5 Iron Removal from V/Al Removed Liquor

Fe removal was performed using V/Al removed liquor (containing ~99 g/L Fe) at 80° C., by adding limestone (15 to 30% w/w pulp density) as the neutralising agent and air as an oxidant with a flowrate of ~5 L/min. The feed liquor analysis is provided in Table 5 and the Fe precipitate analysis is provided in Table 6. The test took 3.5 h for complete Fe removal.

TABLE 5

Representative feed and final liquor analyses for the Fe removal tests.

| | Liquor analysis, mg/L | | | | | | |
|---|---|---|---|---|---|---|---|
| | Fe | V | Ti | Al | Mn | Ca | Mg | Si |
| Feed Liquid | 98731 | 0.3 | 0.1 | 41 | 378 | 33654 | 3793 | 0.5 |
| Final Liquid | 0.23 | — | — | — | 184 | 53249 | 2013 | — |

TABLE 6

Representative precipitated solid analysis for the Fe removal test.

| | Fe precipitate analysis, % | | | | | | |
|---|---|---|---|---|---|---|---|
| | Fe | V | Ti | Al | Mn | Ca | Mg | Si |
| Final Solid | 53.5 | 0.001 | 0.000 | 0.030 | 0.045 | 7.4 | 0.004 | 0.006 |

Effectively complete removal of Fe was achieved by precipitating the Fe as magnetite, leaving <1 mg/L Fe in the final liquor. The Fe-removed liquor analysis reported to have <1 mg/L Fe, 184 mg/L Mn, ~53.2 g/L Ca and ~2 g/L Mg.

3.3.6 Magnesium and Manganese Removal from the Fe Removed Liquor

Mg and Mn removal was performed using the Fe removed liquor at 60° C. by raising the pH of the liquor to ~9 with lime to precipitate Mg as $Mg(OH)_2$ followed by oxidation of Mn(II) to Mn(III)/Mn(IV) with 7.5% $H_2O_2$ to precipitate Mn as Mn-oxide. The feed and final liquor analyses of Mg/Mn removal test are given in Table 7.

TABLE 7

Feed and final liquor analyses of Mg/Mn removal test at 60° C. with lime and $H_2O_2$ addition.

| | Liquor Analysis, mg/L | | |
|---|---|---|---|
| | Mn | Ca | Mg |
| Feed Liquid | 202 | 58697 | 2397 |
| Final Liquid | 0.01 | 61462 | 1.36 |

The complete removal of Mg and Mn was achieved giving a Mg/Mn oxide/hydroxide cake analysis of 0.02% Fe, 1.94% Mn, 22.5% Mg and 14.5% Ca.

3.3.7 Evaporation of the Mg/Mn Removed Liquor

The Mg/Mn depleted liquor was evaporated to obtain ~130 g/L Ca in the final liquor for HCl regeneration test work.

3.3.8 HCl Regeneration from Mg/Mn Removed Evaporated Liquor

HCl regeneration was performed using the evaporated liquor at 80 to 85° C. with 92 to 97% stoichiometric requirement of $H_2SO_4$ addition where 97% stoichiometric addition produced 296 g/L HCl (26.6% w/w HCl) whereas 92% stoichiometric addition produced 260 to 270 g/L HCl (~23 to 24% w/w HCl) concentration. The precipitate generated during HCl regeneration reaction was mainly gypsum ($CaSO_4 \cdot 2H_2O$) with some anhydrite ($CaSO_4$) and a minor amount of basanite ($CaSO_4 \cdot 0.5H_2O$ as hemi-hydrate). The cake washing with ~1.2 times gypsum saturated water reported 126 g/L HCl (~11 to 12% w/w) and ~50 g/L HCl (~4.8% w/w) in the first and second wash, respectively. A third wash may be required for most of the remaining entrained HCl depending on the chloride loss in the second wash cake.

The regenerated HCl was recycled for primary leaching of Ti concentrate under the primary leach conditions where leach extraction was ~44% Fe, 68% V, 55% Al, 99% Mg and 14% Mn as shown in Table 8. This leach data was very similar to the metal's extraction data obtained in the primary leaching with the fresh 21% w/w HCl.

TABLE 8

Metal extraction for the primary leach test with the recycling of regenerated HCl (21% w/w) at 96 to 98° C. 20% pulp density for 2 h duration compared to fresh HCl (21% w/w) at 96 to 98° C. 20% pulp density for 2 h duration.

| | % Extraction | | | | | | | |
|---|---|---|---|---|---|---|---|---|
| | Fe | V | Ti | Al | Mn | Ca | Mg | Si |
| Recycled HCl | 44.3 | 67.8 | 0.7 | 55.1 | 14.2 | — | 99.5 | 0.9 |
| Fresh HCl | 47.2 | 68.8 | 1.5 | 48.3 | 16.0 | — | 96.6 | 0.5 |

The test results of all the stages of Process Stream-1 confirmed that the Stream-1 of the proposed flowsheet illustrated in FIG. 1 is metallurgically viable.

3.4 Process Stream-2:

3.4.1 Secondary Leaching of Primary Leach Residue

Process Stream-2 starts with the secondary leaching of primary leach residue aiming to dissolve Ti minerals from the primary leach residue in $HCl+CaCl_2$) solution in the presence of a reductant. The composition of the primary leach residue used in the study is provided in Table 9:

TABLE 9

Analysis of the primary leach residue used for secondary leaching test work.
Secondary leach feed analysis, %

| Fe | V | Ti | Al | Mn | Ca | Mg | Si |
|---|---|---|---|---|---|---|---|
| 23.18 | 0.12 | 27.44 | 1.35 | 0.21 | 0.03 | 0.02 | 4.56 |

The secondary leach test performed in $HCl+CaCl_2$) solution having ~7M HCl (~21% w/w) and 300 g/L $CaCl_2$) at 75° C. with 4.9% w/w pulp density for 5 h adding ~0.59 g Fe grit 120 per gram of dry primary leach residue. The metals extraction and leach liquor analysis are given in Table 10.

TABLE 10

Metals extraction and leach liquor analysis of the bulk secondary leach tests with reductant addition. Conditions: 300 g/L $CaCl_2$ in HCl + $CaCl_2$ solution having ~7M HCl, 4.9% w/w pulp density and 75° C.

| Test No. | Metals extraction, % | | | | Leach liquor analysis, g/L | | | | | | | |
|---|---|---|---|---|---|---|---|---|---|---|---|---|
| | Fe | V | Ti | Mn | Fe | V | Ti | Al | Mn | Ca | Mg | Si |
| SLR-8 | 92.8 | 92.1 | 84.4 | 94.7 | 40.0 | 0.04 | 12.5 | 0.06 | 0.32 | 100.7 | 0.42 | 0.002 |
| SLR-9 | 92.0 | 92.6 | 83.4 | 93.9 | 39.4 | 0.04 | 11.9 | 0.06 | 0.30 | 88.6 | 0.43 | 0.005 |

The leach extraction was ~93% Fe, ~92% V, ~84% Ti and ~94% Mn, giving a liquor analysis of ~40 g/L Fe, 0.04 g/L V, ~12 g/L Ti, 0.3 g/L Mn and 0.43 g/L Mg along with a free acid concentration of ~133 g/L. XRD analysis of the secondary leach cake revealed a minor ilmenite peak with reasonably higher rutile peak indicating possible precipitation of some dissolved Ti during leaching. The analysis of the secondary leach solid was ~6.5% Fe, 0.04% V, ~16.3% Ti, ~3.8% Al, ~16.5% Si and <0.1% of Mn, Ca and Mg. The cake washing data indicated that two washing stages with 2 to 3 times cake volume of wash solution may be sufficient to remove most of the entrained leach liquor where second wash liquor gave an analysis of ~1 g/L Fe, ~0.25 g/L Ti, ~2 g/L Ca and 1 mg/L V. The leach liquor from secondary leaching was stored for the down-stream processing.

3.4.2 TiO$_2$ Precipitation from Primary Secondary Leach Liquor

As the secondary leach liquor contained mainly Ti(III) chloride, it was therefore oxidised to Ti(IV) chloride with H$_2$O$_2$ prior to TiO$_2$ precipitation. H$_2$O$_2$ consumption for Ti(III) chloride oxidation was calculated to be ~90 kg H$_2$O$_2$ (30%) per ton of Ti concentrate which will be equivalent to 54000 ton of 30% H$_2$O$_2$ consumption per year for the processing of 600,000 ton of Ti concentrate of West Australian origin.

TiO$_2$ precipitation was performed at 95° C. by hydrolysing Ti(IV) chloride in hot water with a ratio of leach liquor to hot water of ~1. The feed and final liquor analyses and Ti precipitation data are given in Table 11.

TABLE 11

Feed/final liquors analyses and Ti precipitation data for the bulk TiO$_2$ precipitation tests at ~95° C.

| Leach Test No. liquor | TiO$_2$ pptn. test | Liquor analysis, mg/L | | | | | | | | Ti pptn. % |
|---|---|---|---|---|---|---|---|---|---|---|
| | | Fe | V | Ti | Al | Mn | Ca | Mg | Si | |
| SLR-8 liq. | TiP-3 feed liq. | 37472 | 37 | 12023 | 59 | 291 | 91695 | 367 | 4 | — |
| | TiP-3 final liq. | 19427 | 23 | 256 | 30 | 156 | 44861 | 198 | 1 | 96.0 |
| SLR-9 liq. | TiP-4 feed liq. | 37399 | 37 | 11875 | 58 | 283 | 91542 | 364 | 5 | — |
| | TiP-4 final liq. | 19591 | 23 | 306 | 29 | 155 | 46155 | 202 | 2 | 95.1 |
| SLR-8 + SLR-9 liq. | TiP-5 feed liq. | 38310 | 44 | 11467 | 55 | 314 | 91120 | 406 | 5 | — |
| | TiP-5 final liq. | 20990 | 27 | 665 | 30 | 173 | 49660 | 229 | 3 | 89.3 |

More than 95% Ti precipitation took place giving ~0.25 g/L Ti analysis in the final liquor, from the feed liquor containing ~12 g/L of Ti. The mineralogy of the precipitated TiO$_2$ was found to be mainly rutile or a mixture of rutile and anatase. The purity of a typical TiO$_2$ sample prepared in the test program was found to be very high (>99.5% purity) where total impurity analysis was 0.24% which includes the elemental analysis of Mg, Ca, Na, K, Al, V, Co, Cr, Cu, Fe, Mn, Mo, Nb, Ni, Pb, Y, Zn, Zr, P, As, Bi, S and Si. Another TiO$_2$ sample prepared in the test work was also pure (>98% purity). However, the Fe analysis reported higher (<1%); other than Fe, the total analysis of the all the impurities was only ~0.22%. This confirmed that high purity TiO$_2$ product was possible to be produced from the Ti concentrate using this flowsheet.

The final liquor was used for further down-stream test work.

3.4.3 Neutralisation of TiO$_2$ Precipitated Final Liquor

The TiO$_2$ precipitated liquor was neutralised with limestone as the free acid analysis reported ~70 g/L to minimise the free acid concentration below 10 g/L. The analysis of the neutralised liquor reported ~20 g/L Fe, ~30 to 40 ppm V/Al, ~0.43 g/L Ti, 0.2 g/L Mn/Mg and 81 g/L Ca. Ideally V and Ti will be recovered from the TiO$_2$ precipitated liquor in this acid neutralisation step by raising the pH of the neutralised liquor to precipitate V, Ti and Al together for further separation. The process step will be identical to the V/Al removal step as explained in Section 3.3.4 of the Process Stream-1.

The treatment of the acid neutralised liquor had two options to adopt: i) evaporation to concentrate the liquor prior to Fe removal; or ii) Fe removal first prior to evaporation. In this investigation, Fe removal was chosen first as the evaporation may cause the conversion of Fe(II) to Fe(III) which will be required to reduce again before Fe removal. Therefore, the neutralised liquor was treated for Fe removal in the next step of the process.

3.4.4 Iron Removal from the Neutralised Liquor

The neutralised liquor was directly used for Fe removal under the similar conditions of Stream-1 Fe removal, where a complete Fe removal was achieved from the feed liquor having ~20 g/L Fe analysis.

Three Fe removal tests [FeR(S2)-1 to FeR(S2)-3] were performed at 80° C. with an air flow of >5 L/min using limestone as the neutralising agent. The initial pH was raised either with lime or limestone addition prior to air addition. In the first test, Fe precipitation was performed using ~20% w/w limestone slurry, however, in later tests 25 to 30% w/w limestone slurry was used. The higher pulp density limestone slurry was used in the later tests to reduce the amount of water coming from limestone slurry as any extra water added will be required to evaporate at later stage of the process.

Figure 9:
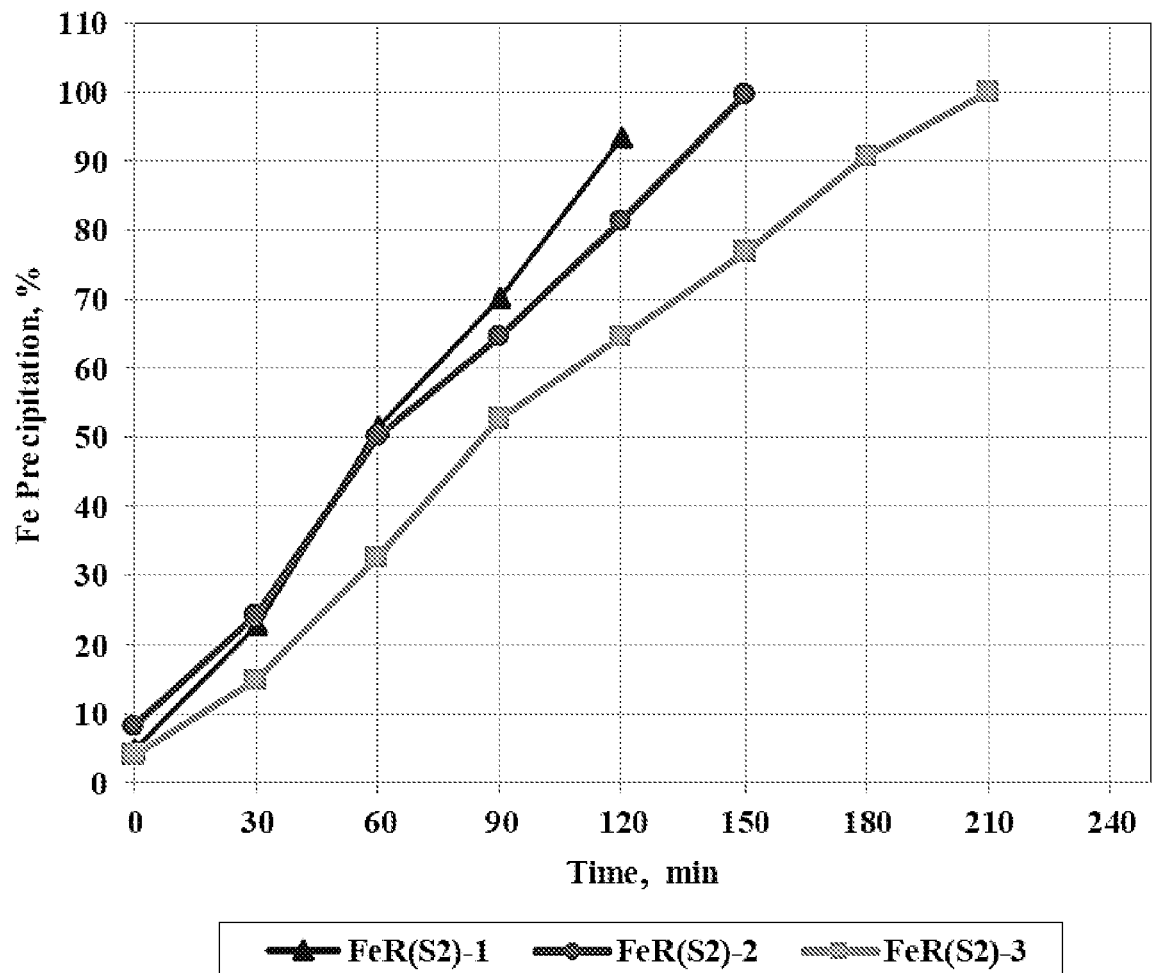
FIG. 9 provides a plot illustrating the Fe precipitation behaviour from the $TiO_2$ precipitated neutralised liquor at 80° C. using limestone as neutralising agent and air flow >5 L/min.

The Fe precipitation behaviour was found to be almost linear with time (FIG. 9) giving complete removal of iron. Similar precipitation behaviour was also observed in the Stream-1 Fe removal stage. The Fe precipitation kinetics of the third test [FeR(S2)-3] was slightly slower possibly due to higher volume (3 L) of feed liquor used compared to the other two tests (feed volume ~2.5 L) where air addition rate was identical for all the three tests. The V, Ti and Al almost completely precipitated during the initial pH increase to ~4 at 80° C. prior to air addition giving ~1 mg/L V/Al and ~5 mg/L Ti analyses in the liquor. The feed and final liquor analyses and precipitated solid analysis are given in Table 12 and Table 13, respectively.

TABLE 12

Feed and final liquor analyses of the Fe precipitation tests from the TiO$_2$ precipitated neutralised liquor at 80° C. using limestone as neutralising agent and air flow >5 L/min.

| Feed/Final liq. | Liquor analysis, mg/L | | | | | | | |
|---|---|---|---|---|---|---|---|---|
| | Fe | V | Ti | Al | Mn | Ca | Mg | Si |
| Feed Liq. | 20305 | 33 | 436 | 42 | 170 | 81549 | 206 | 2 |
| FeR(S2)-1 Final liq. | 448 | 0.1 | 0.5 | 0.1 | 83 | 79141 | 176 | 0.8 |

TABLE 12-continued

Feed and final liquor analyses of the Fe precipitation tests from the TiO$_2$ precipitated neutralised liquor at 80° C. using limestone as neutralising agent and air flow >5 L/min.

| Feed/Final liq. | Liquor analysis, mg/L | | | | | | | |
|---|---|---|---|---|---|---|---|---|
| | Fe | V | Ti | Al | Mn | Ca | Mg | Si |
| FeR(S2)-2 Final liq. | <0.1 | <0.1 | <0.1 | <0.1 | 74 | 90123 | 297 | 0.1 |
| FeR(S2)-3 Final liq. | <0.1 | <0.1 | <0.1 | <0.1 | 74 | 90664 | 196 | 0.1 |

TABLE 13

Precipitated solid analysis for the Fe precipitation tests from TiO$_2$ precipitated neutralised liquor.

| Test No. | Fe Precipitate analysis, % | | | | | | | |
|---|---|---|---|---|---|---|---|---|
| | Fe | V | Ti | Al | Mn | Ca | Mg | Si |
| FeR(S2)-1 | 35.0 | 0.06 | 0.78 | 0.07 | 0.03 | 12.1 | 0.01 | 0.01 |
| FeR(S2)-2 | 37.1 | 0.06 | 0.77 | 0.08 | 0.08 | 12.7 | 0.01 | 0.06 |
| FeR(S2)-3 | 32.2 | 0.05 | 0.65 | 0.06 | 0.07 | 6.0 | 0.01 | 0.01 |

XRD analysis of the Fe(S2)-3 test solid found both goethite and magnetite formation during Fe removal reaction.

3.4.5 Mg and Mn Removal from Fe Removed Liquor and Evaporation of Mg/Mn Removed Liquor The Fe removed liquor was partially evaporated prior to Mg/Mn removal. The Fe removed homogenised bulk liquor was evaporated partially (~34% by mass) by heating. The Ca concentration increased in the evaporated liquor from ~90 g/L to 146 g/L. This liquor was used for Mg/Mn removal having ~0.2 g/L Fe, ~0.37 g/L Mg, 0.17 g/L Mn and 146.4 g/L Ca analysis.

Complete Mg/Mn removal was achieved from the feed liquor containing ~0.17 g/L Mn and 0.37 g/L Mg at 60° C. by raising the pH of the liquor with lime to ~9-10 and oxidising the Mn(II) by adding dilute H$_2$O$_2$. Removal of Mg and Mn were >99% giving 6 mg/L Mg and <1 mg/L Mn in the final liquor. The analyses of feed and final liquors of the Mg/Mn removal test are given in Table 14.

TABLE 14

Feed and final liquor analyses of Mg/Mn removal test at 60° C. with lime addition.

| | Liquor Analysis, mg/L | | | |
|---|---|---|---|---|
| | Fe | Mn | Ca | Mg |
| Feed Liquid | 197 | 171 | 146380 | 368 |
| Final Liquid | 4.9 | 0.4 | 149734 | 6.1 |

The Ca analysis in the final liquor was ~150 g/L. The precipitated solid analysis reported ~5% Fe, 4.7% Mn, 10.3% Ca and 11.4% Mg.

The Mg/Mn removed liquor was further evaporated (~26.5% by mass) to obtain ~231 g/L Ca concentration in the liquor for HCl regeneration test work.

3.4.6 HCl Regeneration from Evaporated Mn/Mg Removed Liquor

HCl regeneration from the evaporated liquor was performed using 53% stoichiometric requirement of H$_2$SO$_4$ at ~85° C. which produced 260 g/L HCl [20.4% w/w HCl (~7.1 M)] concentration in the HCl+CaCl$_2$) final liquor along with the precipitation of anhydrite (CaSO$_4$) solid. The cake washing data with ~2 times cake mass using gypsum saturated water indicated that two washes should be sufficient to recover most of the entrained HCl from the cake. The first wash and second wash liquor analyses reported ~82 g/L HCl and ~20 g/L HCl, respectively.

The recycling of regenerated HCl+CaCl$_2$) solution containing 7 M HCl and ~245 g/L CaCl$_2$) for secondary leaching gave low Ti extraction (67%) along with 91% Fe, 71% V, 7% Al and 99% Mn extraction. Comparing the leach data obtained for Fe (~92%) and Ti (83 to 84%) in SLR-8/SLR-9 tests, Ti extraction was very low in the HCl+CaCl$_2$) recycle leach test. The inventors speculate that there could be possible two reason for low Ti extraction: i) low CaCl$_2$) concentration in the liquor (less total chloride concentration); and ii) not efficient reducing behaviour in a small mass of slurry (650 g) with small dose (0.5 g/10 min) of Fe grit addition, as the reaction with Fe powder most possibly took place on the surface of the slurry instead of with the bulk of the slurry. The inventors consider that this result can be improved through further process optimisation to regenerate a HCl+CaCl$_2$) solution to achieve >85% Ti extraction.

The test results of all the stages of Process Stream-2 confirmed that the Stream-2 of the proposed flowsheet (FIG. 1) is also metallurgically viable. Therefore, this investigation successfully confirmed the operation of the proposed flowsheet (FIG. 1) for titanium-bearing material, in particular to this Ti concentrate of West Australian origin.

Example 2—Titanium Dioxide Recovery from Titanomagnetite Concentrate

1. Experimental Process

This two-step leaching technique was applied in this example on a titanomagnetite titanium bearing material such to examine its leaching behaviour. The vanadium bearing titanomagnetite concentration used in the study was of Australian origin of the composition detailed below. The primary leaching of the concentrate was conducted in HCl solution whereas secondary leaching of the primary leach residue was performed in a mixed solution of HCl and CaCl$_2$).

2. Materials and Method 2.1 Materials

The analysis of the concentrate is given in Table 15 which shows 52% Fe, 9.5% Ti, 0.57% V, 1.3% Al, ~2% Si, 0.9% Mg and ~0.3% each of Mn and Ca.

TABLE 15

Analysis of titanomagnetite concentrate.

| Titanomagnetite concentrate analysis (%) | | | | | | | |
|---|---|---|---|---|---|---|---|
| Fe | V | Ti | Al | Mn | Ca | Mg | Si |
| 52.0 | 0.57 | 9.53 | 1.32 | 0.29 | 0.33 | 0.94 | 1.95 |

2.2 Method 2.2.1 Primary Leaching

Primary leaching of titanomagnetite sample was performed in a 2 L glass reactor using 20% w/w HCl at 70 to 95° C. with 20% w/w pulp density for 2 to 4 h. The reactor was fitted with a glass lid connected to a condenser. Required amounts of HCl solution and concentrate were added to the reactor and placed in an oil (PEG 400) bath. The temperature of the oil bath was raised and once the reaction temperature attained, a sample was collected, and the reaction was continued for 2 to 4 hours. Samples were collected at every hour and filtered. Solid was top washed initially with ~15% HCl solution followed by repulped/washed with deionised (DI) water. At the end of the reaction the reactor bulk slurry was filtered; solid was washed thoroughly and dried at 60° C. in an oven.

2.2.2 Secondary Leaching

The secondary leach test was performed in a 2 L glass reactor using primary leach residues in HCl—CaCl$_2$) mix solution at 70° C. in the absence and presence of a reductant (Fe Grit 120) for 2 h to 4 h duration. A required amount of primary leach wet cake and HCl CaCl$_2$) solution were taken in the reactor and fitted with a condenser, thermometer and ORP probe, and placed in a hot water bath. The reaction was continued for 0.5 h at test temperature, after which ~1 g Fe grit 120 was added (where appropriate) manually at a regular interval of ~10 minutes till the end of the reaction under nitrogen blanket. Online ORP of the reaction was recorded during leaching with Fe grit addition. Samples were collected at an interval of 0.5 to 1 h and filtered immediately in a filter press. The solid was initially repulped/washed with 15% w/w HCl followed by repulped/washed with DI water. The final slurry was processed similarly as the collected sample. The liquor (filtrate) sample was diluted immediately for analysis to avoid any crystallisation if occurs in the leach liquor upon storing at ambient temperature. The bulk filtrate liquor was stored at ~60° C. in the oven to prevent crystallisation of ferrous chloride for the test where Fe grit was added.

3. Results and Discussion 3.1 Primary Leaching

Figure 10:
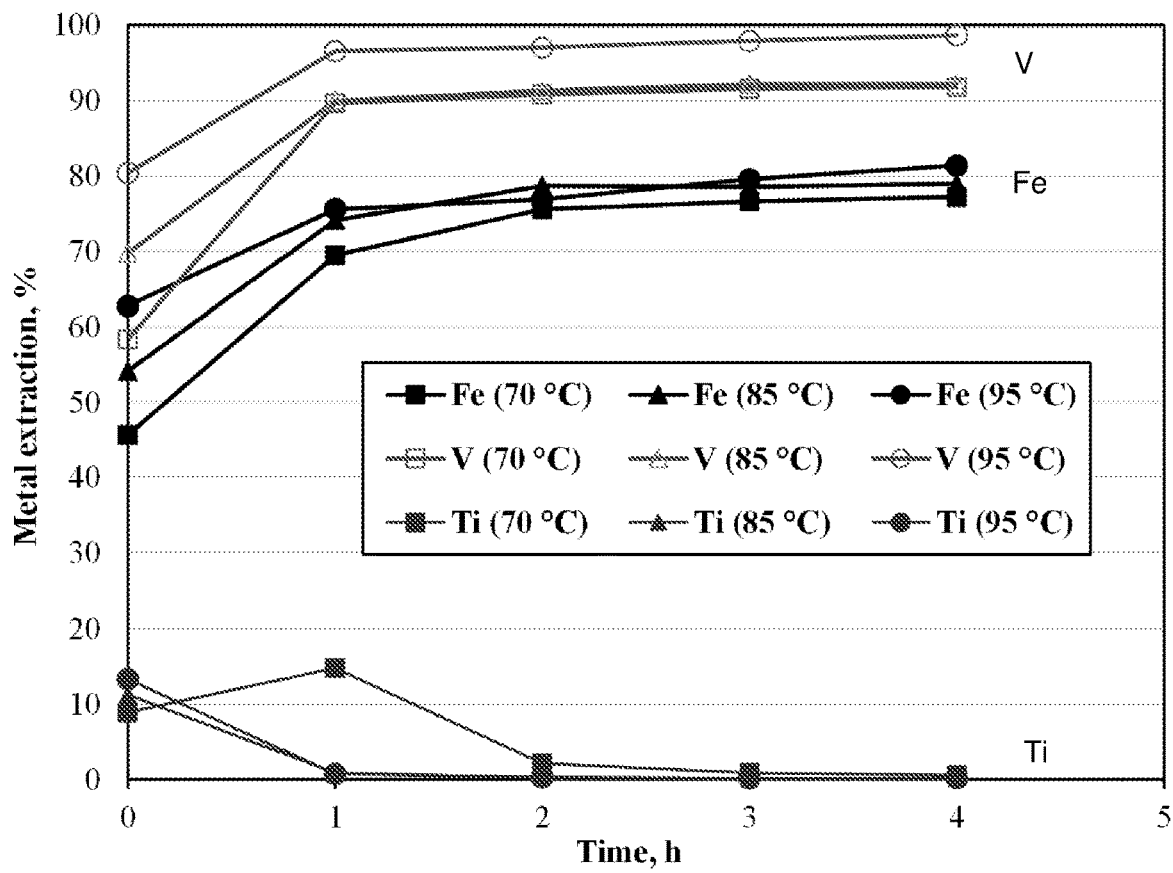
FIG. 10 provides a plot illustrating the effect of temperature on Fe, V and Ti extractions from titanomagnetite concentrate under the leaching conditions of 20% w/w pulp density, 20.1% w/w HCl concentration and 4 h.

Initially three primary leach tests were performed by varying temperature 70° C., 85° C. and 95° C. using 20% w/w pulp density in 20.1% w/w HCl solution for 4 h, to examine the dissolution behaviour of titanomagnetite concentrate and to generate the leach residue for secondary leaching. The extractions of Fe, V and Ti are given in FIG. 10 where Fe and V extraction increased up 2 h after which it was not significant. The effect of temperature on V extraction was higher at 95° C. giving ~97% V extraction at 1 h compared to 70° C. and 85° C. where V extraction was ~90%. FIG. 10 indicates that Ti dissolution took place mainly during heating (at 70° C. up to 1 h) after which the dissolved Ti precipitated and reported in the leach residue.

The residue analysis for these initial leach tests are given in Table 16 which shows the decrease of Fe, V and Al, and increase of Ti and Si analyses with the increase of leaching temperature. The secondary leach tests of these residues are given in Section 3.2 where 70° C. and 85° C. test residues gave better Ti leaching efficiency compared to 95° C. leach residue. The Ti analysis in the primary leach liquor of 70° C. test reported ~0.12 g/L which was higher than the Ti analysis for 85° C. test leach liquor (0.01 g/L). Based on the secondary leaching performance and the primary leach liquor Ti analysis, 85° C. and 2 h duration was chosen to be optimum conditions for the further primary leach tests. The leach liquor analysis for 85° C. leach test was 111.5 g/L Fe, 1.4 g/L V, 0.01 g/L Ti, 2 g/L Al, 1.9 g/L Mg, ~0.29 g/L Mn, 0.26 g/L Ca, 0.16 g/L Si and ~2 g/L free HCl.

TABLE 16

Leach residue analysis of the temperature variation primary leach tests.

| Test Temperature | Leach residue analysis (%) | | | | | | |
|---|---|---|---|---|---|---|---|
| | Fe | V | Ti | Al | Mn | Mg | Si |
| 70° C. | 29.4 | 0.16 | 25.5 | 1.48 | 0.51 | 0.47 | 3.16 |
| 85° C. | 27.7 | 0.15 | 26.0 | 1.29 | 0.48 | 0.39 | 3.23 |
| 95° C. | 23.8 | 0.04 | 32.3 | 1.27 | 0.57 | 0.42 | 4.23 |

Figure 11:
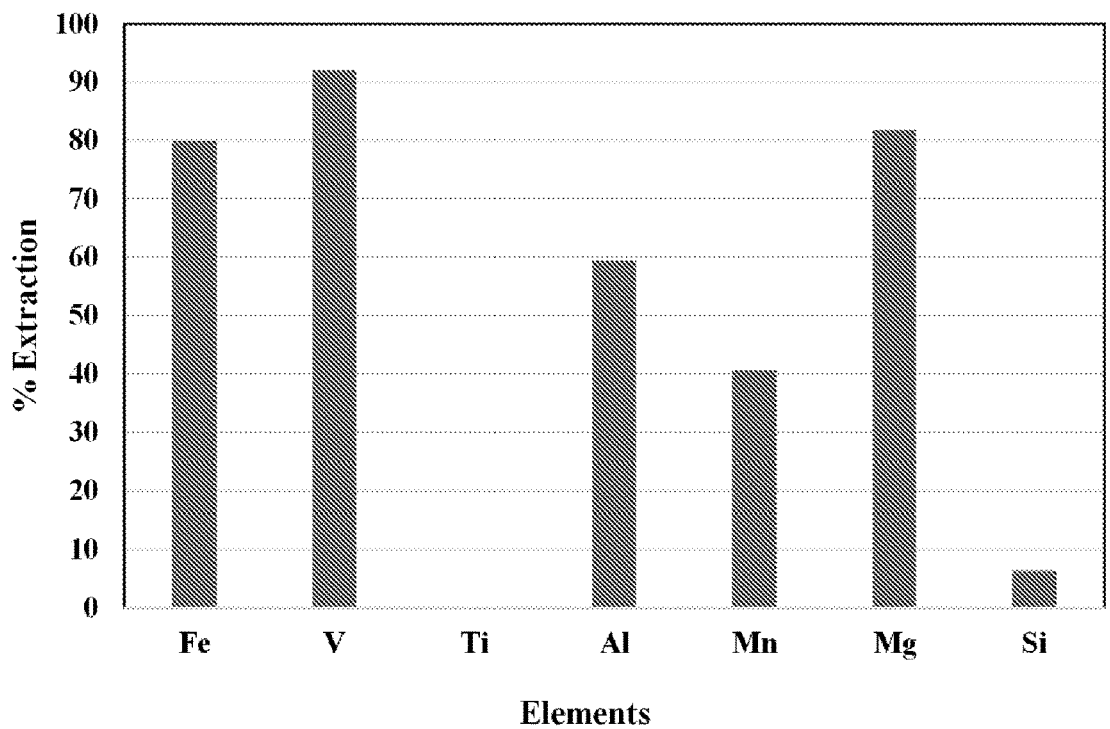
FIG. 11 provides a plot illustrating the extraction of metals from titanomagnetite concentrate at 85° C. for 2 h with 20.4% w/w pulp density and 19.8% HCl solution.

Another primary leach test was performed at 85° C. without sampling for 2 h under the conditions of 20% w/w pulp density in 20.1% w/w HCl to generate enough leach residue for the secondary leach tests. The leach extractions are given in FIG. 11 which shows ~79% Fe, 92% V, 59% Al, ~41% Mn, 82% Mg and ~6% Si extractions. The liquor analysis reported 115.6 g/L Fe, ~1.6 g/L V, 0.04 g/L Ti, 2.2 g/L Al, 0.3 g/L Mn, 0.25 g/L Ca, 1.95 g/L Mg and 0.24 g/L Si in the final leach liquor. The leach residue analysis was 30% Fe, 0.13% V, 25.8% Ti, 1.43% Al, 0.45% Mn, 0.41% Ca, 0.42% Mg and ~3.4% Si.

3.2. Secondary Leaching 3.2.1 Preliminary Secondary Leaching

Initially three secondary leach tests were performed at 70° C. in HCl+CaCl$_2$) mix solution having 17 to 18% w/w HCl (~6-6.3M) and 230 to 240 g/L CaCl$_2$) at 2.2% w/w pulp density for 4 h using the residues from 70° C., 85° C. and 95° C. primary leach tests. No reductant was added in these tests. The HCl and CaCl$_2$) concentrations were kept lower in the HCl+CaCl$_2$) mix solution (compared to 20% w/w HCl+300 g/L CaCl$_2$) solution) for these tests due to low pulp density (2.2% w/w) used in the leaching. The Ti extraction from these tests are given in Table 17 which shows >98.5% Ti extraction from 70° C. and 85° C. primary leach residues and lower Ti extraction (~91%) from 95° C. primary leach residue. This indicates that <85° C. was better temperature for primary leaching of the titanomagnetite concentrate to achieve >98.5% Ti extraction in the secondary leaching. The Fe extraction was almost similar (98.5 to 99.6%) for all three primary leach residues. The Mg extraction was ~89-92% for these leach residues whereas Al extraction decreased with the increase of primary leach test temperature.

TABLE 17

Secondary leach metal extraction under the test conditions of 17 18% w/w HCl (~6 to 6.3M) and 230 to 240 g/L CaCl$_2$ mix solution, 2.2% w/w pulp density, 70° C. and 4 h.

| Primary leach residue | Extraction (%) | | | | | |
|---|---|---|---|---|---|---|
| | Fe | V | Ti | Al | Mn | Mg |
| 70° C. test residue | 98.5 | — | 98.6 | 43.0 | — | 89.3 |
| 85° C. test residue | 99.6 | 100.0 | 98.8 | 35.0 | 99.5 | 92.4 |
| 95° C. test residue | 99.3 | — | 90.6 | 14.3 | — | 90.3 |

Figure 12:
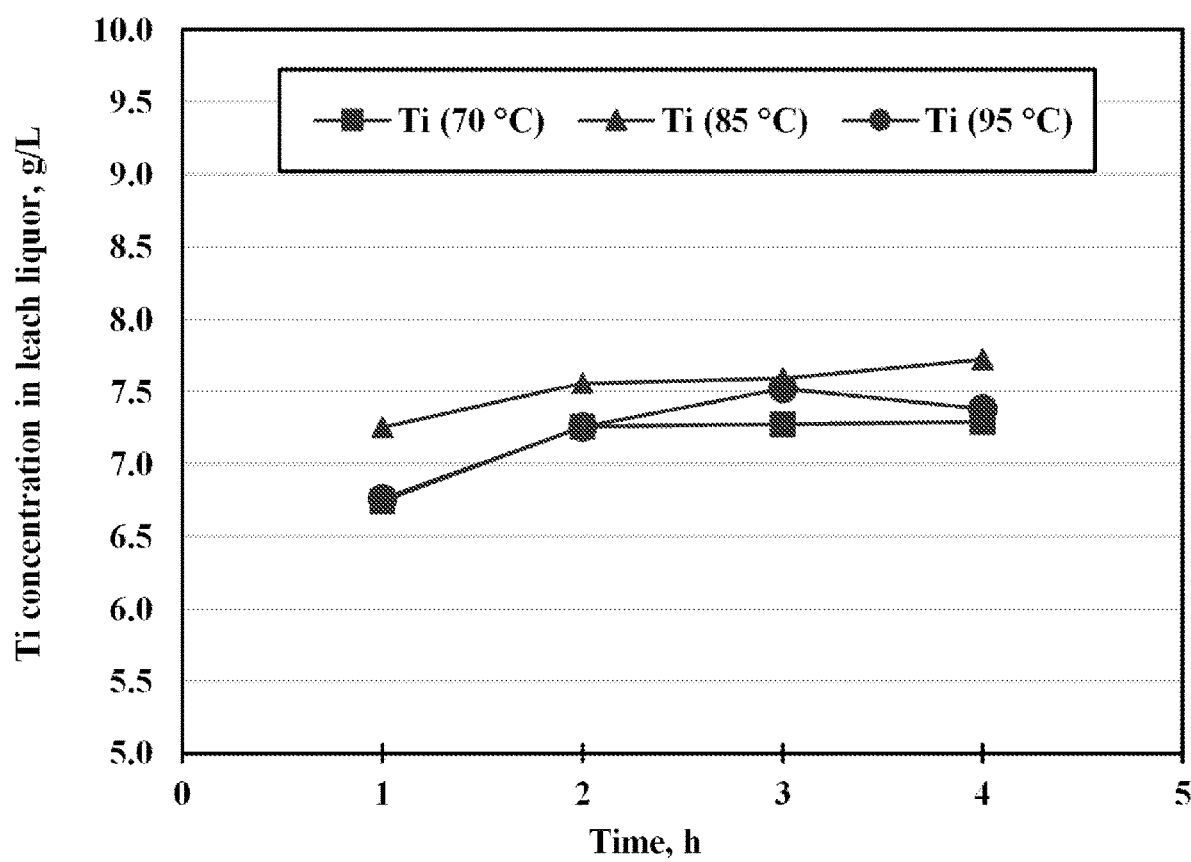
FIG. 12 provides a plot illustrating leach liquors Ti analysis for the secondary leach tests with the primary leach residues.

The secondary leach liquors Ti analyses are given in FIG. 12 which shows slightly higher Ti analysis for the test with 85° C. leach residue, otherwise Ti analysis was almost similar (6.7 to 7.7 g/L). The Ti analysis data indicates that most of the Ti leaching took place within 1 h of the reaction with a little further increase up to 2 h, after which Ti concentration remained similar. This indicates that 2 h leaching should be sufficient to extract most of the Ti from the primary leach residues. Therefore, further secondary leach tests were performed for 2 h duration.

3.2.1 Leaching at Higher Pulp Density

Further secondary leaching tests were performed in the absence and presence of Fe grit 120 at higher pulp density 6.2% w/w to examine the effect of the reductant and leach efficiency at higher pulp density. The leaching tests were carried out using 85° C. primary leach residue under the test conditions of ~20% w/w HCl with 300 g/L CaCl$_2$) mix solution, 70° C. and 2 h. The leach extractions are given in Table 18. The metals extraction in the presence of reductant were found to be slightly better except for Al and Mg compared to its absence. The Ti extractions were 89.8% and 91.2% in the absence and presence of Fe Grit 120, respectively. The leach liquor and leach residues analyses are given in Table 19 and Table 20, respectively.

TABLE 18

Metals extraction in the secondary leaching under the test conditions of 6.2% w/w pulp density, ~20% w/w HCl with 300 g/L CaCl$_2$ mix solution, 70° C. and 2 h.

| Fe grit 120 added (g/100 g of primary leach solid) | Extraction (%) | | | | | |
|---|---|---|---|---|---|---|
| | Fe | V | Ti | Al | Mn | Mg |
| — | 89.3 | 92.7 | 89.8 | 24.5 | 91.4 | 22.8 |
| 14.1 | 94.3 | 94.8 | 91.2 | 17.1 | 93.7 | 22.5 |

TABLE 19

Leach liquor analysis of secondary leaching under the test conditions of 6.2% w/w pulp density, ~20% w/w HCl with 300 g/L CaCl$_2$ mix solution, 70° C. and 2 h.

| Fe grit 120 added (g/100 g of primary leach solid) | Leach liquor analysis (mg/L) | | | | | | |
|---|---|---|---|---|---|---|---|
| | Fe | V | Ti | Al | Mn | Ca | Mg |
| — | 26048 | 109 | 19430 | 218 | 429 | 108379 | 126 |
| 14.1 | 41006 | 116 | 19516 | 200 | 495 | 99936 | 139 |

TABLE 20

Leach solid analysis of the secondary leaching under the test conditions of 6.2% w/w pulp density, ~20% w/w HCl with 300 g/L CaCl$_2$ mix solution, 70° C. and 2 h.

| Fe grit 120 added (g/100 g of primary leach solid) | Leach liquor analysis (%) | | | | | | |
|---|---|---|---|---|---|---|---|
| | Fe | V | Ti | Al | Mn | Mg | Si |
| — | 5.35 | 0.03 | 9.88 | 5.80 | 0.05 | 1.64 | 21.27 |
| 14.1 | 5.40 | 0.03 | 9.66 | 5.95 | 0.05 | 1.45 | 22.40 |

4. Conclusions

The two-step leaching process was found to be suitable for titanomagnetite concentrate to achieve high Ti extraction in the secondary leaching in the presence and absence of Fe powder as a reductant. Titanium extractions were ~90% and 91% without and with reductant under the test conditions 6.2% w/w pulp density, ~20% w/w HCl with 300 g/L CaCl$_2$) mix solution, 70° C. and 2 h giving Ti analysis in the liquor ~19.5 g/L. The addition of Fe powder during secondary leaching can be considered as a better option as Fe in the leach liquor need to be present as ferrous before the leach liquor can be treated for TiO$_2$ precipitation.

The optimum parameters for the primary leaching of titanomagnetite were 85° C. and 2 h in 20% w/w HCl solution at 20% pulp density where ~79% Fe, 92% V, 59% Al, ~41% Mn, 82% Mg and ~6% Si extractions took place.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A process for recovering titanium dioxide from a titanium-bearing material, the process including the steps of:
    leaching the titanium-bearing material in a first leaching step at atmospheric pressure and at a temperature of 70 to 97° C. with a first lixiviant to produce a first leach solution comprising undissolved first leach solids that include a titanium content and a first leach liquor, the first lixiviant comprising hydrochloric acid at a concentration of less than 23% w/w;
    separating the first leach liquor and the undissolved first leach solids;
    leaching the first leach solids in a second leaching step at atmospheric pressure and at a temperature of 60 to 80° C. with a second lixiviant in the presence of a Fe powder reductant to produce a second leach solution comprising undissolved second leach solids and a second leach liquor that includes a leached titanium content and iron content, the second lixiviant comprising a mixed chloride solution comprising less than 23% w/w hydrochloric acid and an additional chloride selected from alkali metal chlorides, magnesium chloride and calcium chloride, or mixtures thereof;
    separating the second leach liquor and the undissolved second leach solids;
    precipitating titanium dioxide from the second leach liquor by addition of heated or boiling water under an inert gas or nitrogen atmosphere to raise the temperature of the second leach liquor to 85 to 100° C. to produce a treated second leach liquor and a titanium dioxide containing solid;
    separating the titanium dioxide containing solid from the treated second leach liquor;
    precipitating the iron content from the treated second leach liquor by adding a neutralising agent and an oxidant to the treated second leach liquor at a temperature of 70 to 90° C. to raise the pH of the second leach liquor to 4 to 8 to produce an iron removed slurry comprising an iron removed second leach liquor and an iron precipitated solid;
    separating the iron removed second leach liquor from the iron precipitated solid; and
    regenerating the second lixiviant for recycle to the second leaching step,
    thereby recovering the titanium from the second leach solution as titanium dioxide.

2. The process according to claim 1, wherein the first leaching step is conducted with the first lixiviant comprising 20 to 22% w/w HCl solution, preferably at 85 to 97° C.

3. The process according to claim 1, wherein the titanium-bearing material includes at least one value metal selected from iron, vanadium, manganese, magnesium or aluminium and the first leach liquor is subjected to steps to recover the at least one value metal therefrom.

4. The process according to claim 3, wherein the at least one value metal includes vanadium and/or aluminium, and the process further comprises a vanadium and/or aluminium removal step comprising:
adding a neutralising agent, preferably at least one of limestone, lime or MgO, to the first leach liquor at a temperature of 50 to 80° C. under an inert gas or nitrogen atmosphere, to raise the pH of the liquor to 3 to 6 thereby precipitating vanadium and aluminium to produce a V/Al removed slurry; and
separating the V/Al removed slurry into a liquid fraction comprising a V/Al removed liquor and a solid fraction comprising the V/Al precipitated solid.

5. The process according to claim 3, wherein the at least one value metal includes iron, and the process further comprises an iron removal step comprising:
adding a neutralising agent, preferably at least one of limestone, lime or MgO, and an oxidant to the first leach liquor at a temperature of 70 to 90° C. to raise the pH of the liquor to 4 to 7 thereby precipitating iron to produce an iron removed slurry; and
separating the iron removed slurry into a liquid fraction comprising an iron removed liquor and a solid fraction comprising the iron precipitated solid.

6. The process according to claim 5, wherein the oxidant comprises at least one of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid, or an oxygen containing gas, preferably at least one of hydrogen peroxide or an oxygen containing gas, more preferably oxygen or air.

7. The process according to claim 5, wherein the iron removal step is conducted after the vanadium and/or aluminium removal step.

8. The process according to claim 3, wherein the at least one value metal includes manganese and/or magnesium, and the process further comprises a manganese and/or magnesium removal step comprising:
adding a neutralising agent, preferably lime, and an oxidant, preferably $H_2O_2$ or an oxygen containing gas, more preferably air, to the iron removed liquor at a temperature of 60 to 90° C. to raise the pH of the liquor to 9 to 10 thereby precipitating Mg and/or Mn to produce a Mg/Mn removed slurry; and
separating the removed Mg/Mn slurry into a liquid fraction comprising a Mg/Mn removed liquor and a solid fraction comprising the precipitated Mg and/or Mn solid, wherein the manganese and/or magnesium removal step is conducted after the iron removal step.

9. The process according to claim 1, further comprising:
regenerating the first lixiviant and recycling the first lixiviant to the first leaching step and wherein the first lixiviant is regenerated by:
concentrating the chloride content of the Mg/Mn removed liquor through water removal, preferably boiling and/or evaporation, to produce an evaporated liquor;
reacting the evaporated liquor with at least 98% w/w sulphuric acid at a temperature of 30 to 90° C., preferably at 80 to 85° C. under atmospheric conditions to produce 20 to 22% w/w hydrochloric acid and a solid precipitate,
separating the precipitated solid and hydrochloric acid liquor; and
recycling the hydrochloric acid liquor to the first leaching step.

10. The process according to claim 4, further comprising the following steps prior to precipitating vanadium and aluminium from the first leach liquor:
neutralising at least part of the free acid (HCl) in the first leach liquor by adding to the first leach liquor at least one of: the feed titanium-bearing material, limestone, lime or MgO, to produce a first liquor neutralised slurry including a neutralised leach solid; and
separating the first liquor neutralised slurry into a solid fraction comprising the neutralised leach solid and a liquid fraction comprising the neutralised first leach liquor.

11. The process according to claim 10, further comprising the following steps following the neutralising steps:
reduction of the neutralised first leach liquor at 45 to 75° C. by the addition of metallic iron, preferably iron powder, to convert ferric chloride in the first leach liquor to ferrous chloride; and
separating the reduced first leach liquor into a liquid fraction comprising a reduced liquor and a solid fraction comprising any unreacted solid iron powder.

12. The process according to claim 1, wherein the iron is substantially precipitated as magnetite, preferably precipitated as magnetite only.

13. The process according to claim 1, wherein the second leaching step is conducted with a second lixiviant comprising a mixed chloride solution of 20 to 22% w/w HCl and the additional chloride having a total chloride concentration of 400 to 550 g/L, preferably at 70 to 80° C.

14. The process according to claim 1, wherein the second leaching step includes two leach regimes, comprising:
a first leach regime performed in the mixed chloride solution (without any iron powder addition); and
a second leach regime performed in the mixed chloride solution with iron powder addition.

15. The process according to claim 1, further comprising:
introducing an oxidant into the second leach liquor prior to titanium dioxide precipitation step to oxidise any Ti (III) content to Ti (IV) by controlling the oxidation reduction potential of the second leach liquor within 100 to 200 mV,
wherein the oxidant is selected from air, oxygen, alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid, other non-sulphur containing oxidants, or mixtures thereof.

16. The process according to claim 1, further comprising the steps of:
adding a neutralising agent, preferably at least one of limestone, lime or MgO, to the treated second leach liquor at a temperature of 50 to 80° C. under an inert gas or nitrogen atmosphere, to raise the pH of the liquor to 3 to 6 thereby precipitating vanadium and aluminium to produce a V/Al removed slurry; and
separating the V/Al removed slurry into a liquid fraction comprising a V/Al removed treated second leach liquor and a solid fraction comprising the V/Al precipitated solid.

17. The process according to claim 1, further comprising the steps of:
- adding a neutralising agent, preferably lime, and an oxidant, preferably $H_2O_2$ or oxygen containing gas, more preferably air, to the iron removed liquor at a temperature of 60 to 90° C. to raise the pH of the liquor to 9 to 10 thereby precipitating Mg and/or Mn to produce a Mg/Mn removed slurry; and
- separating the removed Mg/Mn slurry into a liquid fraction comprising an Mg/Mn removed liquor and a solid fraction comprising the precipitated Mg and/or Mn solid.

18. The process according to claim 1, wherein the step of regenerating the second lixiviant for recycle to the second leaching step comprises:
- concentrating the chloride content of the treated second leach liquor through water removal, preferably boiling and/or evaporation, to produce a concentrate chloride solution;
- reacting the evaporated liquor with at least 98% w/w sulphuric acid at a temperature of 30 to 90° C., preferably at 80 to 85° C. under atmospheric conditions to produce a mixed chloride solution having 20 to 22% w/w hydrochloric acid, an additional chloride content in the solution and a solid precipitate,
- separating the precipitated solid from the mixed chloride solution; and
- recycling the mixed chloride solution to the second leaching step.

19. The process according to claim 1, wherein the neutralising agent in the process comprises MgO, and the process further comprises a Mg removal step in which $Mg(OH)_2$ is precipitated using lime and an MgO regeneration stage in which the $Mg(OH)_2$ is calcined, preferably at 300 to 400° C., to regenerate MgO for recycling as the neutralising agent in the process.

20. The process according to claim 1, wherein the titanium-bearing material comprises at least one of:
a. a titanium-bearing ore material including titanium-bearing ore or orebody, concentrate thereof, modified, ore thereof and tailings thereof, and mixtures thereof;
b. orebody containing titanium minerals such as ilmenite, rutile and/or leucoxene;
C. vanadium associated with titanium minerals such as titano-magnetite, vanadium bearing minerals;
d. titanium-bearing leach residues and slags; or
e. mineral processing residues.

* * * * *